US012654932B2

(12) United States Patent
Olsen et al.

(10) Patent No.: US 12,654,932 B2
(45) Date of Patent: Jun. 16, 2026

(54) ROBOTIC CLEANER DEBRIS REMOVAL INTEGRATED DOCKING STATION

(71) Applicant: SHARKNINJA OPERATING LLC, Needham, MA (US)

(72) Inventors: Lloyd Olsen, Somerville, MA (US); Simon Hughes, Kingston Upon Thames (GB); Spencer Walker-Fooks, London (GB); Pol Bernat Belenguer, New York, NY (US)

(73) Assignee: SharkNinja Operating LLC, Needham, MA (US)

( * ) Notice: Subject to any disclaimer, the term of this patent is extended or adjusted under 35 U.S.C. 154(b) by 328 days.

(21) Appl. No.: 18/367,739

(22) Filed: Sep. 13, 2023

(65) Prior Publication Data

US 2025/0083895 A1 Mar. 13, 2025

(51) Int. Cl.

*B65F 1/12* (2006.01)
*A47L 9/10* (2006.01)
*B65F 1/16* (2006.01)

(52) U.S. Cl.

CPC .............. *B65F 1/127* (2013.01); *A47L 9/106* (2013.01); *B65F 1/163* (2013.01); *A47L 2201/024* (2013.01); *B65F 2001/1653* (2013.01); *B65F 2210/179* (2013.01)

(58) Field of Classification Search

CPC .... A47L 9/106; A47L 2201/024; B65F 1/127; B65F 1/163; B65F 2210/179; B65F 2201/1653

See application file for complete search history.

(56) References Cited

U.S. PATENT DOCUMENTS

| | | | |
|---|---|---|---|
| 11,348,269 B1 * | 5/2022 | Ebrahimi Afrouzi ... G01S 17/48 |
| 2013/0058635 A1 | 3/2013 | Vrdoljak |
| 2013/0152337 A1 | 6/2013 | Thorne |
| 2014/0150201 A1 | 6/2014 | Mcgee et al. |
| 2015/0013102 A1 | 1/2015 | Bilger et al. |
| 2015/0040340 A1 | 2/2015 | Bilger et al. |
| 2015/0135474 A1 | 5/2015 | Gidwell |
| 2015/0297054 A1 | 10/2015 | Weeks et al. |
| 2015/0351596 A1 | 12/2015 | Thorne |
| 2016/0128530 A1 | 5/2016 | Thorne et al. |

(Continued)

FOREIGN PATENT DOCUMENTS

| | | | |
|---|---|---|---|
| CN | 112493930 A * | 3/2021 | .......... A47L 11/4025 |
| CN | 110974090 | 11/2021 | |

(Continued)

OTHER PUBLICATIONS

WO2022171170A1(machine translation) (Year: 2022).*

(Continued)

*Primary Examiner* — Andrew A Horton
(74) *Attorney, Agent, or Firm* — Secant IP, P.L.L.C.

(57) ABSTRACT

In an approach to a docking station for a robotic cleaner, the docking station includes a base; a trash bin having a substantially air-impermeable trash bag removably disposed thereon; a dock dirty air inlet defined in the base, the dock dirty air inlet being configured to fluidly couple to the robotic cleaner; and a dock suction motor, wherein the dock suction motor is activated after the robotic cleaner is determined to be docked with the docking station and configured to urge debris from the robotic cleaner into the trash bin.

20 Claims, 15 Drawing Sheets

(56) References Cited

U.S. PATENT DOCUMENTS

| | | | |
|---|---|---|---|
| 2016/0174793 | A1 | 6/2016 | Burke et al. |
| 2016/0220080 | A1 | 8/2016 | Thorne |
| 2016/0220081 | A1 | 8/2016 | Xu et al. |
| 2016/0324388 | A1 | 11/2016 | Vrdoljak et al. |
| 2016/0374533 | A1 | 12/2016 | Innes et al. |
| 2017/0042319 | A1 | 2/2017 | Conrad et al. |
| 2017/0112343 | A1 | 4/2017 | Innes et al. |
| 2017/0127896 | A1 | 5/2017 | Carter et al. |
| 2017/0144810 | A1 | 5/2017 | Birdsell |
| 2017/0215667 | A1 | 8/2017 | Thorne et al. |
| 2018/0035854 | A1 | 2/2018 | Thorne |
| 2018/0064301 | A1 | 3/2018 | Cottrell et al. |
| 2018/0068815 | A1 | 3/2018 | Cottrell |
| 2018/0070785 | A1 | 3/2018 | Udy et al. |
| 2018/0255991 | A1 | 9/2018 | Der Marderosian et al. |
| 2018/0306432 | A1 | 10/2018 | Ognjen et al. |
| 2018/0325252 | A1 | 11/2018 | Hopke et al. |
| 2018/0338654 | A1 | 11/2018 | Kelsey |
| 2018/0338656 | A1 | 11/2018 | Carter et al. |
| 2019/0038098 | A1 | 2/2019 | Thorne et al. |
| 2019/0059668 | A1 | 2/2019 | Thorne et al. |
| 2019/0069740 | A1 | 3/2019 | Thorne et al. |
| 2019/0069744 | A1 | 3/2019 | Liggett et al. |
| 2019/0090701 | A1 | 3/2019 | Tonderys et al. |
| 2019/0090705 | A1 | 3/2019 | Thorne et al. |
| 2019/0191947 | A1 | 6/2019 | Freese et al. |
| 2019/0193120 | A1 | 6/2019 | Brown et al. |
| 2019/0246853 | A1 | 8/2019 | Sardar et al. |
| 2019/0274500 | A1 | 9/2019 | Thorne et al. |
| 2019/0274501 | A1 | 9/2019 | Antonisami et al. |
| 2019/0302793 | A1 | 10/2019 | Leech et al. |
| 2019/0320866 | A1 | 10/2019 | Thorne et al. |
| 2019/0335968 | A1 | 11/2019 | Harting et al. |
| 2019/0343349 | A1 | 11/2019 | Clare et al. |
| 2019/0357740 | A1 | 11/2019 | Thorne et al. |
| 2019/0387939 | A1* | 12/2019 | Pruiett .................. A47L 9/2873 |
| 2020/0000298 | A1 | 1/2020 | Brown et al. |
| 2020/0022543 | A1 | 1/2020 | Gill et al. |
| 2020/0022544 | A1 | 1/2020 | Gill et al. |
| 2020/0022553 | A1 | 1/2020 | Gill et al. |
| 2020/0046184 | A1 | 2/2020 | Freese et al. |
| 2020/0077855 | A1 | 3/2020 | Brown et al. |
| 2020/0085267 | A1 | 3/2020 | Thorne et al. |
| 2020/0085269 | A1 | 3/2020 | Thorne |
| 2020/0121144 | A1 | 4/2020 | Gacin et al. |
| 2020/0121148 | A1 | 4/2020 | Hoffman et al. |
| 2020/0138260 | A1 | 5/2020 | Sutter et al. |
| 2020/0166949 | A1 | 5/2020 | Leech et al. |
| 2020/0170470 | A1 | 6/2020 | Liggett et al. |
| 2020/0201348 | A1 | 6/2020 | Leech |
| 2020/0205631 | A1 | 7/2020 | Brown et al. |
| 2020/0205634 | A1 | 7/2020 | Sutter et al. |
| 2020/0237171 | A1 | 7/2020 | Xu et al. |
| 2020/0288929 | A1 | 9/2020 | Brunner |
| 2020/0288930 | A1 | 9/2020 | Wells |
| 2020/0297172 | A1 | 9/2020 | Tonderys et al. |
| 2020/0301430 | A1 | 9/2020 | Irkliy et al. |
| 2020/0315418 | A1 | 10/2020 | Howard et al. |
| 2020/0345196 | A1 | 11/2020 | Innes et al. |
| 2020/0367711 | A1 | 11/2020 | Thorne et al. |
| 2020/0371526 | A1 | 11/2020 | Kamada |
| 2020/0383547 | A1 | 12/2020 | Sutter et al. |
| 2021/0007569 | A1 | 1/2021 | Howard et al. |
| 2021/0022574 | A1 | 1/2021 | Harting |
| 2021/0030227 | A1 | 2/2021 | Mathieu et al. |
| 2021/0038032 | A1 | 2/2021 | Brown |
| 2021/0085144 | A1 | 3/2021 | Woodrow et al. |
| 2021/0169289 | A1 | 6/2021 | Thorne et al. |
| 2021/0177223 | A1 | 6/2021 | Der Marderosian et al. |
| 2021/0186282 | A1 | 6/2021 | Mathieu et al. |
| 2021/0204684 | A1 | 7/2021 | Heman-Ackah et al. |
| 2021/0254615 | A1 | 8/2021 | Vrdoljak et al. |
| 2021/0282617 | A1* | 9/2021 | Deng .................... A47L 9/1445 |
| 2021/0307581 | A1 | 10/2021 | Thorne et al. |
| 2021/0315428 | A1 | 10/2021 | Udy et al. |
| 2021/0345845 | A1 | 11/2021 | Pruiett |
| 2021/0386261 | A1 | 12/2021 | Woodrow et al. |
| 2021/0386262 | A1 | 12/2021 | Uchendu et al. |
| 2022/0031131 | A1 | 2/2022 | Mcclay et al. |
| 2022/0031133 | A1 | 2/2022 | Der Marderosian et al. |
| 2022/0039622 | A1 | 2/2022 | Kim et al. |
| 2022/0071459 | A1 | 3/2022 | Gacin et al. |
| 2022/0095864 | A1 | 3/2022 | Der Marderosian et al. |
| 2022/0125256 | A1 | 4/2022 | Lessard et al. |
| 2022/0287521 | A1 | 9/2022 | Cottrell et al. |
| 2022/0322903 | A1 | 10/2022 | Lessard |
| 2022/0400922 | A1 | 12/2022 | Mcclay et al. |
| 2022/0408994 | A1 | 12/2022 | Hill |
| 2023/0070147 | A1 | 3/2023 | Harting et al. |
| 2023/0157495 | A1 | 5/2023 | Copeland et al. |
| 2023/0248192 | A1 | 8/2023 | Brown et al. |
| 2023/0320550 | A1 | 10/2023 | Teuscher et al. |
| 2023/0329502 | A1 | 10/2023 | Chirikjian |
| 2023/0355065 | A1 | 11/2023 | Finnegan |
| 2023/0414052 | A1 | 12/2023 | Mcclay et al. |
| 2024/0008699 | A1 | 1/2024 | Innes et al. |
| 2024/0172909 | A1 | 5/2024 | Conrad |
| 2024/0415352 | A1 | 12/2024 | Mcclay et al. |

FOREIGN PATENT DOCUMENTS

| | | | |
|---|---|---|---|
| EP | 2394553 | 4/2016 | |
| WO | 2022171170 | 8/2022 | |
| WO | WO-2022171170 A1 * | 8/2022 | .......... A47L 11/4091 |
| WO | 2022188213 | 9/2022 | |
| WO | 2023014136 | 2/2023 | |

OTHER PUBLICATIONS

CN112493930A(machine translation) (Year: 2021).*

PCT Search Report and Written Opinion mailed Dec. 5, 2024, received in corresponding PCT Application No. PCT/US24/46609, 13 pages.

* cited by examiner

ROBOTIC CLEANER DEBRIS REMOVAL INTEGRATED DOCKING STATION

TECHNICAL FIELD

The present disclosure is generally directed to automated cleaning apparatuses and more specifically to robotic cleaners and docking stations for robotic cleaners.

BACKGROUND

Autonomous surface treatment apparatuses are configured to traverse a surface (e.g., a floor) while removing debris from the surface with little to no human involvement. For example, a robotic vacuum cleaner may include a controller, a plurality of driven wheels, a suction motor, a brush roll, and a dust cup for storing debris. The controller causes the robotic vacuum cleaner to travel according to one or more patterns (e.g., a random bounce pattern, a spot pattern, a wall/obstacle following pattern, and/or the like). While traveling pursuant to one or more patterns, the robotic vacuum cleaner collects debris in the dust cup. As the dust cup gathers debris, the performance of the robotic vacuum cleaner may be degraded. As such, the dust cup may need to be emptied at regular intervals to maintain consistent cleaning performance.

BRIEF DESCRIPTION OF THE DRAWINGS

Reference should be made to the following detailed description which should be read in conjunction with the following figures, wherein like numerals represent like parts.

DETAILED DESCRIPTION

Figure 1:
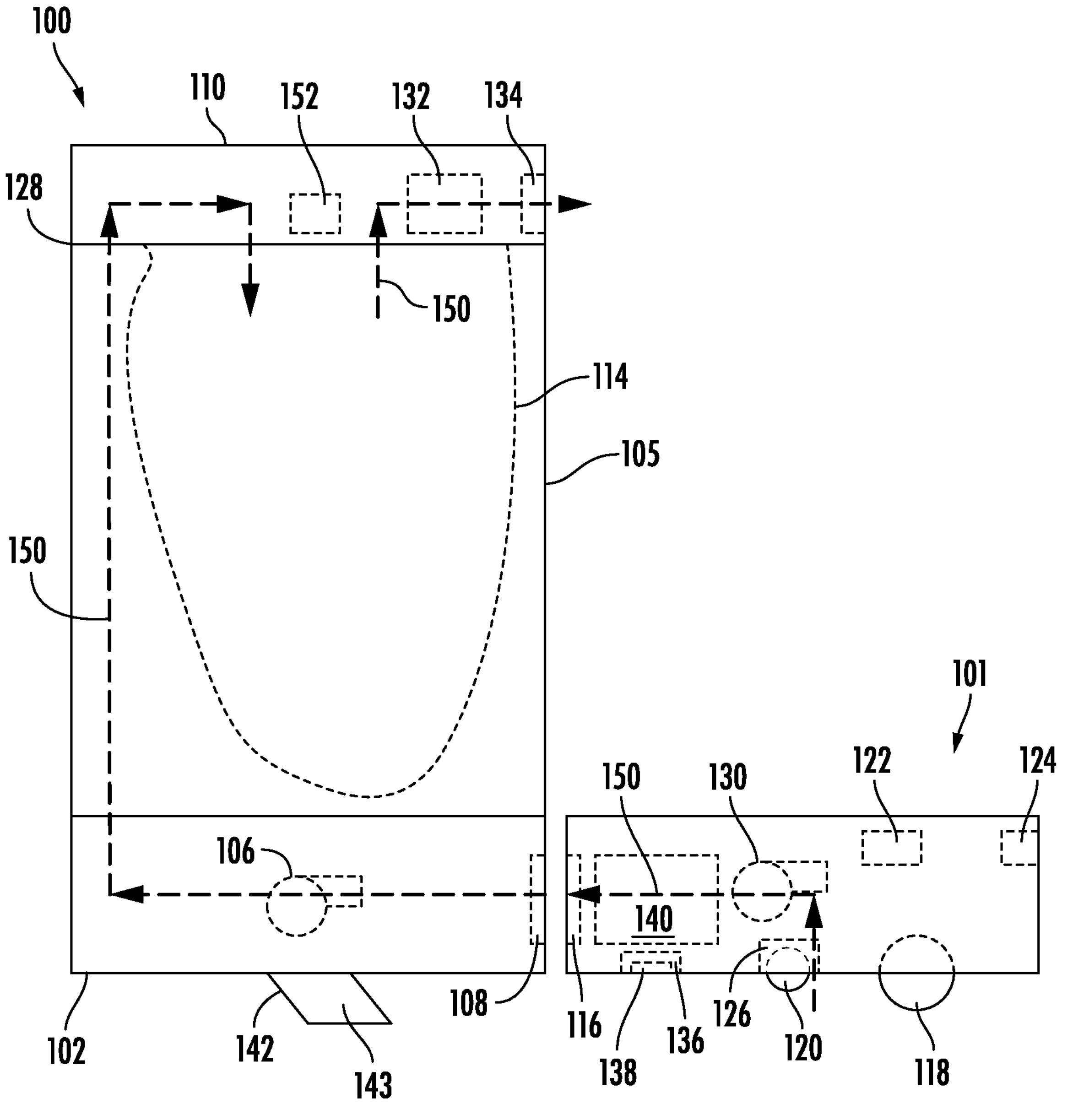
FIG. 1 shows an example schematic view of a robotic cleaner and a docking station for the robotic cleaner configured to remove debris from a dust cup of the robotic cleaner, consistent with embodiments of the present disclosure.

The present disclosure is not limited in its application to the details of construction and the arrangement of components set forth in the following description or illustrated in the drawings. The examples described herein may be capable of other embodiments and of being practiced or being carried out in various ways. Also, it may be appreciated that the phraseology and terminology used herein is for the purpose of description and should not be regarded as limiting as such may be understood by one of skill in the art. Throughout the present description, like reference characters may indicate like structure throughout the several views, and such structure need not be separately discussed. Furthermore, any particular feature(s) of a particular exemplary embodiment may be equally applied to any other exemplary embodiment(s) of this specification as suitable. In other words, features between the various exemplary embodiments described herein are interchangeable, and not exclusive.

The present disclosure is generally directed to a robotic cleaning system that includes a robotic cleaner and a docking station for the robotic cleaner configured to remove debris from a dust cup of the robotic cleaner. The docking station includes a trash bin configured to receive the debris from the dust cup of the robotic cleaner during an auto-evacuation operation, whereby a suction motor in the docking station creates a suction force to urge the debris from the dust cup in the robotic cleaner into the trash bin of the docking station. In some instances, the trash bin may include a trash bag for receiving the debris, which may make emptying the trash bin easier for a user. The docking station is further configured to allow a user to manually deposit trash into the trash bin via a hinged lid. Combining the functions of the docking station with the functions of a trash bin saves a user from having to dedicate space to both a robotic cleaner docking station and a trash bin.

FIG. 1 shows an example schematic view of a robotic cleaner 101 and a docking station 100 for the robotic cleaner 101 configured for auto-evacuation of debris from the robot dust cup 140 into the trash bin in the docking station 100. The robotic cleaner 101 includes robot suction motor 130 configured to draw air and debris into the robotic cleaner 101 through robot inlet 126. The suction from the robot suction motor 130 urges the debris into the robot dust cup 140, and the air drawn in by the robot suction motor 130 exits the robotic cleaner 101 through robot air outlet port 138. To reduce and/or prevent any debris from exiting the robotic cleaner 101, the air first passes through robot outlet filter 136, which may be, for example, a filter medium.

The robotic cleaner 101 is further configured to autonomously clean a surface and includes at least one drive wheel 118, an agitator 120 disposed in the robot inlet 126 to urge debris into the robot inlet 126, and one or more sensors 124. Sensors 124 may include one or more navigation sensors or devices, such as a camera or Light Detection and Ranging (LIDAR) sensor. The robotic cleaner 101 includes a controller 122, which may be, for example, a microcontroller or microprocessor, to control the autonomous cleaning of the surface. In addition, the controller 122 may control the auto-evacuation of the debris from the robot dust cup 140 into the trash bin 105 in the docking station 100.

The robotic cleaner 101 also includes a robot outlet port 116 configured to fluidly couple to a dock dirty air inlet 108 on the docking station 100. The dock dirty air inlet 108 is configured to fluidly couple to at least a portion of the robotic cleaner 101 such that at least a portion of any debris stored within the robot dust cup 140 can be urged through the dock dirty air inlet 108 and into the docking station trash bag 114. During an auto-evacuation operation suction created by a dock suction motor 106 urges air and debris to exit the robotic cleaner 101 through the robot outlet port 116.

The docking station 100 includes a base 102, a trash bin 105, and a lid 110 rotatably coupled to the trash bin 105 by a hinge 128 disposed on a back side of the docking station 100, the dock suction motor 106 (shown in hidden lines) disposed within the base 102, and a trash bag 114 (shown in hidden lines) disposed within the trash bin 105. The trash bag 114 may include a porous material (e.g., a filter material in the form of a bag) or a substantially air-impermeable material (e.g., a plastic material in the form of a bag). As used herein, a substantially air-impermeable material is one that prevents at least 99% of air from passing through the material. The docking station 100 further includes the dock dirty air inlet 108 (shown in hidden lines) disposed within the base 102 and a dock clean air outlet 134 (shown in hidden lines), both fluidly coupled to the dock suction motor 106. Clean air exiting the docking station 100 through the dock clean air outlet 134 first passes through dock outlet filter 132 (e.g., a filter medium, shown in hidden lines).

Figure 1A:
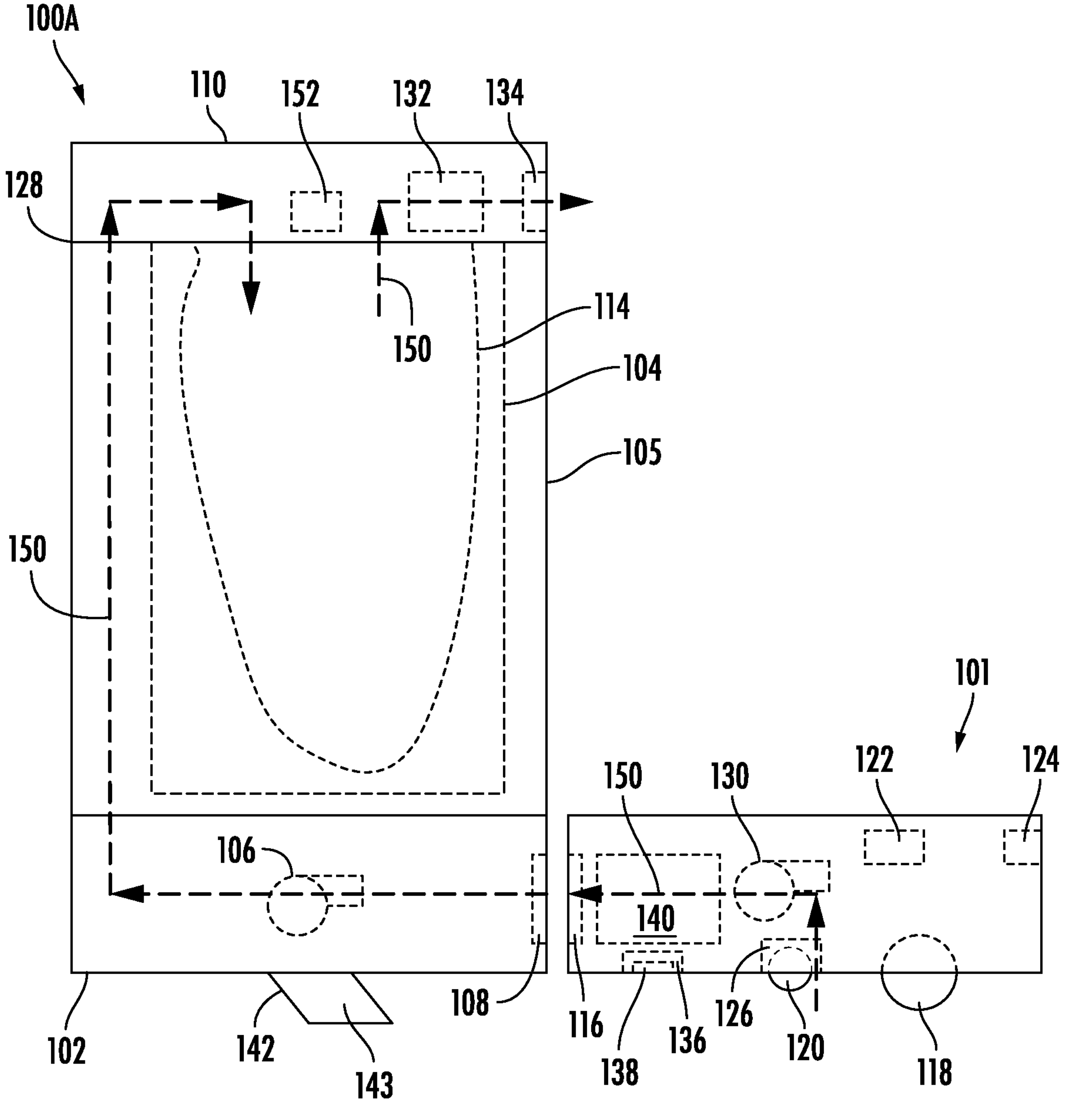
FIG. 1A shows another example schematic view of a robotic cleaner and a docking station for the robotic cleaner configured to remove debris from a dust cup of the robotic cleaner, consistent with embodiments of the present disclosure.

FIG. 1A shows another example schematic view of a robotic cleaner 101 and a docking station 100A for the robotic cleaner 101 configured to remove debris from a debris receptacle 104 of the robotic cleaner. Like the docking station 100 of FIG. 1, the docking station 100A includes the base 102, the trash bin 105, and the lid 110 coupled to the trash bin 105 by the hinge 128, the dock suction motor 106 (shown in hidden lines) disposed within the base 102, and the trash bag 114 (shown in hidden lines) disposed within the debris receptacle 104. The docking station 100A, however, also includes a removable debris receptacle 104 (shown in hidden lines) disposed within the trash bin 105. Having the removable debris receptacle 104 allows for a user to remove the debris receptacle 104, for example, for cleaning.

Like the docking station 100 of FIG. 1, the docking station 100A further includes the dock dirty air inlet 108 (shown in hidden lines) disposed within the base 102 and the dock clean air outlet 134 (shown in hidden lines), both fluidly coupled to the dock suction motor 106. Clean air exiting the docking station 100 through the dock clean air outlet 134 first passes through dock outlet filter 132 (e.g., a filter medium, shown in hidden lines).

While the following discussion is directed to the example docking station 100 of FIG. 1, it should be appreciated that the discussion is also applicable to the example docking station 100A of FIG. 1A.

Figure 2A:
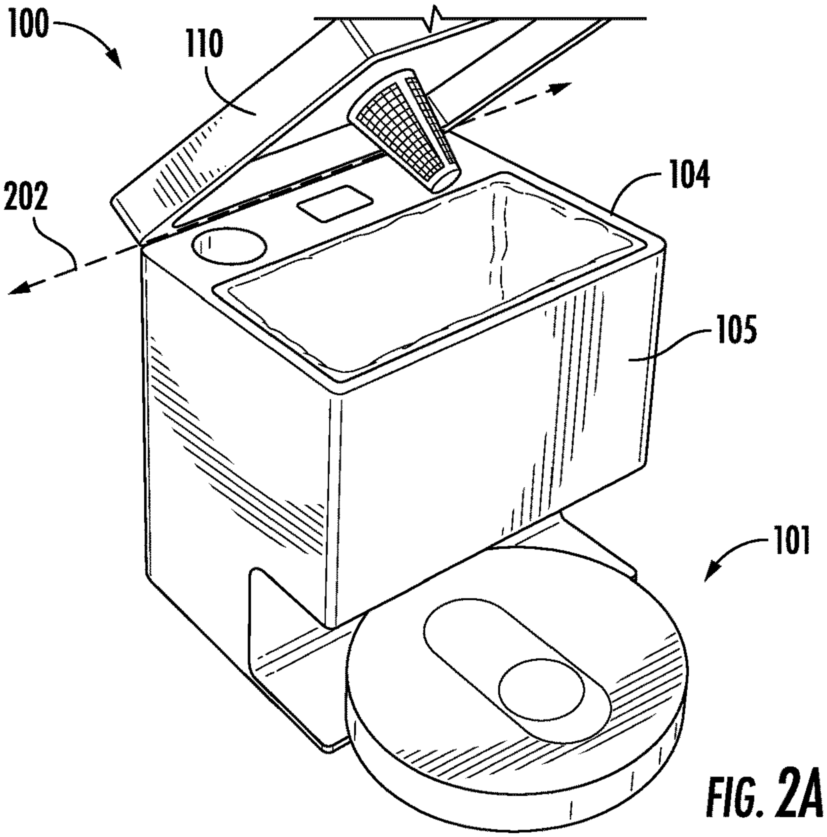
FIG. 2A shows a perspective view of a docking station and a robotic vacuum cleaner configured to dock with the docking station, consistent with embodiments of the present disclosure.

As shown in FIG. 2A, the lid 110 is configured to pivot about an axis 202 extending along the hinge 128 between a closed (e.g., as shown in FIG. 1) and an open (e.g., as shown in FIG. 2A) position. In the open position, the lid 110 allows the user to manually insert trash into the trash bag 114 for disposal, or to remove and replace the trash bag 114 when, for example, the trash bag 114 is full. In some embodiments, the docking station 100 includes pedal 142 disposed on an exterior surface of trash bin 105 and operatively coupled to the lid 110 and configured to urge the lid 110 into the open position upon application of a force (e.g., by a user) to a top surface 143 of pedal 142. Pedal 142 may be disposed anywhere on the exterior surface of the trash bin 105 that allows the user to access the pedal 142 when, for example, the user wants to manually dispose of trash into the trash bin 105.

In an embodiment, the docking station 100 may include a lid sensor 152 to detect that the lid 110 is open. When the sensor detects that the lid is open, the controller 122 may be configured to either prevent an auto-evacuation operation from starting or pause an auto-evacuation operation that is in progress, until the lid 110 is closed. In some instances, a lockout (e.g., a latch) may prevent the lid 110 from being opened during an auto-evacuation operation. In another embodiment, the lid 110 may be opened during an auto-evacuation operation, but when the lid 110 is opened, the large opening of the trash bin 105 will effectively break the vacuum from the suction motor 106, thereby effectively stopping the auto-evacuation operation until the lid 110 is closed.

In another embodiment, docking station 100 may include a touch-free sensor to detect the presence of the user close to the lid 110 of the docking station 100 and a touch-free mechanism to urge the lid 110 into the open position in response to the detection of the presence of the user. In this embodiment, the controller 122 may be configured to disable the touch-free mechanism during an auto-evacuation operation to prevent the user from opening the trash bin 105 while the auto-evacuation operation is in progress. Alternatively, the controller 122 may be configured to pause the auto-evacuation operation when the touch-free sensor signals that the user is attempting to open the trash bin 105 and resume the auto-evacuation operation when the lid 110 has closed. In this embodiment, the pedal 142 may be eliminated, although the pedal 142 may also be included in case of a failure of the touch-free mechanism.

The lid 110 is configured to be pivoted between an open position and a closed position. When the lid 110 is in the closed position, the dock suction motor 106 is fluidly coupled to the trash bin 105 and the dock dirty air inlet 108. When the lid 110 is in the open position, the user may manually deposit trash into the trash bin 105. In addition, when the lid 110 is in the open position, the trash bag 114 is configured to be removable from the trash bin 105. For example, when the trash bin 105 is in the open position, the dock suction motor 106 may be disabled.

The docking station 100 is configured to auto-evacuate the debris from the robot dust cup 140 into the trash bag 114 of trash bin 105. When the robotic cleaner 101 seeks to empty the robot dust cup 140, the robotic cleaner 101 can enter a docking mode. When in the docking mode, the robotic cleaner 101 approaches the docking station 100 in a manner that allows the robotic cleaner 101 to fluidly couple the robot outlet port 116 to the dock dirty air inlet 108. In other words, when in docking mode, the robotic cleaner 101 can generally be described as moving to align itself relative to the docking station 100 such that the robotic cleaner 101 can become docked with the docking station 100. For example, when in docking mode, the robotic cleaner 101 may approach the docking station 100 in a forward direction of travel until reaching a predetermined distance from the docking station 100, stop at the predetermined distance and rotate approximately 180°, and proceed in a rearward direction of travel until the robotic cleaner 101 docks with the docking station 100.

After the robotic cleaner 101 is determined to be docked with the docking station 100 and in response to a triggering event, such as the docking station 100 detecting the presence of the robotic cleaner 101 (e.g., through charging contacts, using a hall effect sensor, and/or the like), the docking station 100 proceeds to evacuate in response to the detection of the presence. In some instances, the docking station 100 detects whether the lid 110 is properly closed (e.g., a user may have too much trash in the trash bin 105 or have improperly closed the lid 110), for example, by using the lid sensor 152 to detect that the lid 110 is open, and only start the evacuation if the lid 110 is properly closed. Similarly, since docking station 100 is configured to allow a user to manually deposit trash into the trash bin in addition to an auto-empty dock, in some instances sensors may be used to detect when there is too much trash in the trash bin 105 to complete an auto-empty cycle (e.g., an IR emitter that emits across the trash bin 105 to an IR sensor, wherein breaking the IR beam happens when the trash is above a certain level) and only start the auto-evacuation of the robotic cleaner 101 if the trash level is below the threshold.

When the robotic cleaner 101 is docked with docking station 100, the robot outlet port 116 of the robotic cleaner 101 is fluidly coupled with the dock dirty air inlet 108. When the dock suction motor 106 is activated, the dock suction motor 106 urges debris stored in the robot dust cup 140 of the robotic cleaner 101 to be drawn into the trash bag 114 of the trash bin 105. The debris may then collect in the trash bag 114 of trash bin 105 for later disposal. The trash bag 114 of trash bin 105 may be configured such that the trash bag 114 can receive debris from the robot dust cup 140 multiple times (e.g., at least two times) before the trash bag 114 of the trash bin 105 becomes full (e.g., the performance of the docking station 100 is substantially degraded). In other words, the trash bag 114 of trash bin 105 may be configured such that the robot dust cup 140 of the robotic cleaner 101 can be emptied several times before the trash bag 114 of trash bin 105 becomes full.

In some instances, the dock suction motor 106 is activated prior to the robotic cleaner 101 engaging the docking station 100. In these instances, the suction generated by the dock suction motor 106 at the dock dirty air inlet 108 may urge the robotic cleaner 101 into engagement with the docking station 100. As such, the dock suction motor 106 may help facilitate the alignment of the robotic cleaner 101 with the dock dirty air inlet 108.

In an embodiment, air is drawn through robotic cleaner 101 and the docking station 100 along an air path 150 during an auto-evacuation operation to urge the debris collected in robot dust cup 140 into trash bag 114 in the docking station 100. The dock suction motor 106 is configured to create a suction force to draw air into air path 150 through the robot inlet 126 and the robot dust cup 140, to draw air and debris from the robot dust cup 140 through the robot outlet port 116 and into the dock dirty air inlet 108. The air is urged along air path 150 into the lid 110 (e.g., a lid duct 412 (FIG. 6A) defined within the lid 110), where gravity urges the debris to drop into the trash bag 114. In an embodiment, the lid 110 may include a cyclonic separator to urge the debris into the trash bag 114 (see FIG. 4 discussed below). The air exits the docking station 100 through the dock clean air outlet 134. In order to reduce and/or prevent debris from exiting the docking station 100 through the dock clean air outlet 134, the air first passes through dock outlet filter 132.

The dock suction motor 106 and the robot suction motor 130 may, in some instances, be configured to cooperate to transfer debris from the robot dust cup 140 and into the trash bag 114, and, in other instances, only one of the dock suction motor 106 or the robot suction motor 130 may be used to transfer debris from the robot dust cup and into the trash bag 114.

Figure 2B:
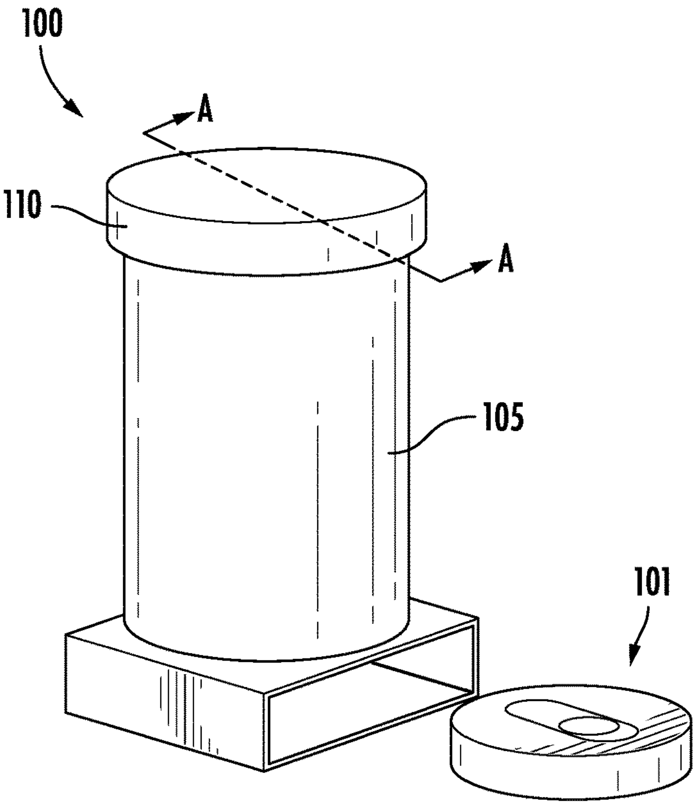
FIG. 2B shows another perspective view of a docking station and a robotic vacuum cleaner configured to dock with the docking station, consistent with embodiments of the present disclosure.

FIG. 2B shows another perspective view of the docking station 100 and the robotic cleaner 101 configured to dock with the docking station, consistent with embodiments of the present disclosure. In the example of FIG. 2B, the docking station 100 has the dock dirty air inlet 108 configured for the robotic cleaner 101 to dock with the docking station 100 from the front of docking station 100.

Figure 3:
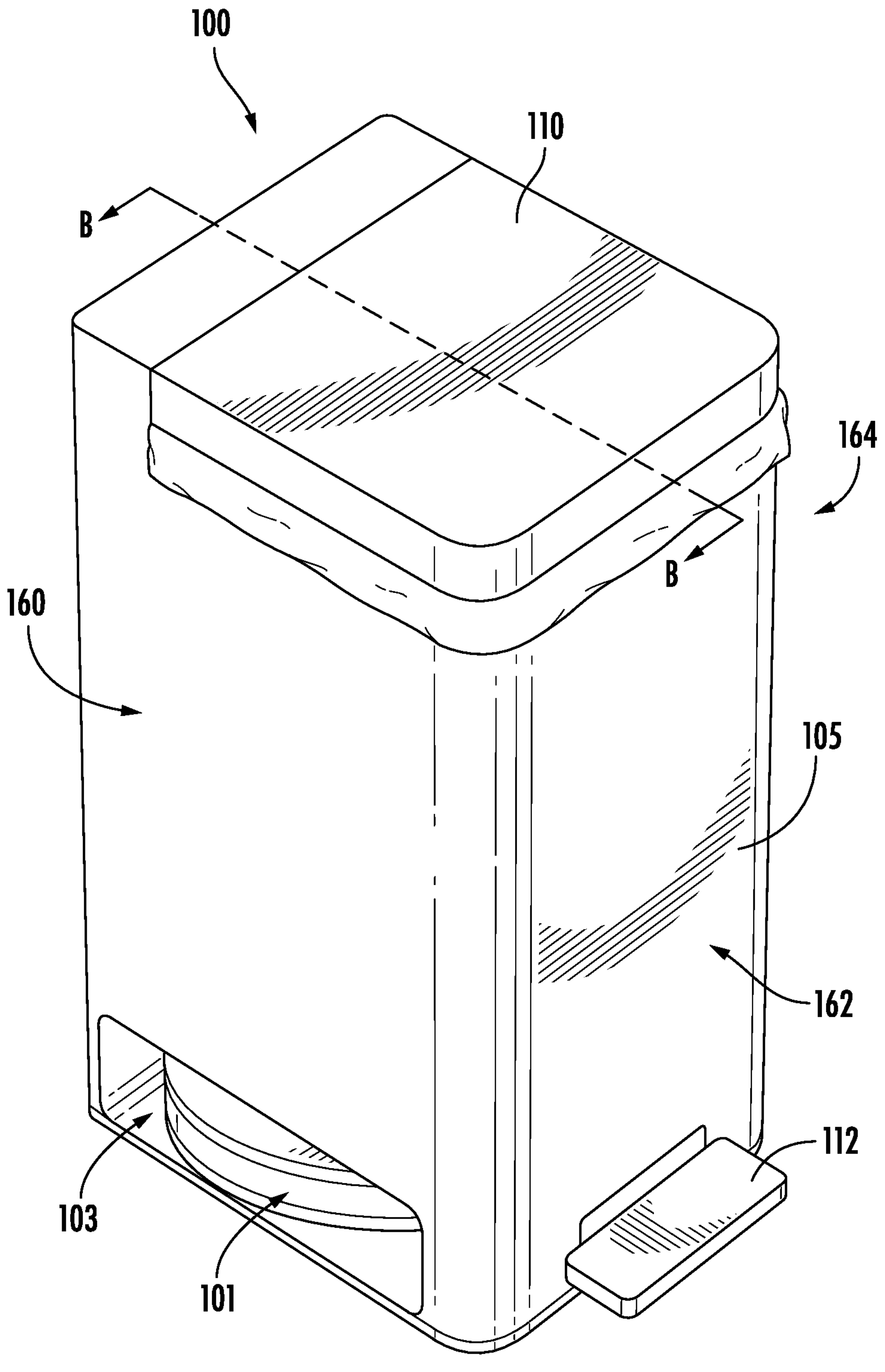
FIG. 3 shows a perspective view of a docking station that receives a robotic vacuum cleaner, consistent with embodiments of the present disclosure.

FIG. 3 shows a perspective view of an example of the docking station 100 that receives the robotic cleaner 101 within a cavity 103 defined therein, consistent with embodiments of the present disclosure. The cavity 103 may be sized to received the entirety of the robotic cleaner 101. In the example of FIG. 3, the docking station 100 has the dock dirty air inlet 108 configured for the robotic cleaner 101 to dock with the docking station 100 from the left side 160 of docking station 100. In another embodiment, the docking station 100 may have the dock dirty air inlet 108 configured for the robotic cleaner 101 to dock with the docking station 100 from the right side 164 of docking station 100. Having the robotic cleaner 101 dock with the docking station 100 from either the left side 160 or the right side 164 of the docking station 100 allows the pedal 112 to be located on the front side 162 of the docking station 100 for the convenience of the user when manually depositing trash or when removing and replacing the trash bag 114. The front side 162 extends between the left side 160 and the right side 164 and faces a user when in use. The front side 162, left side 160 and right side 164 extend transverse to a surface on which the docking station 100 sets.

Figure 4:
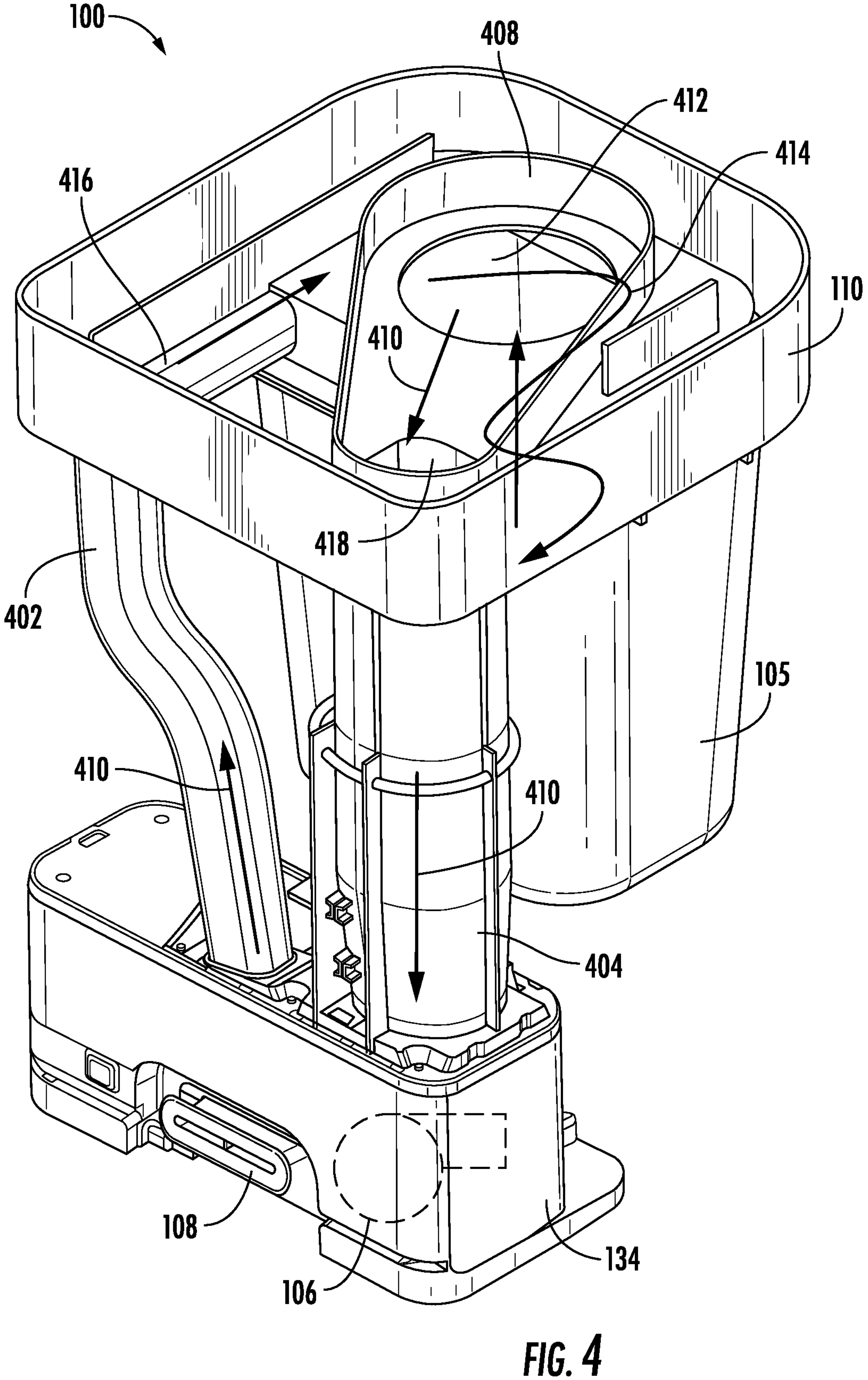
FIG. 4 shows a cutaway view of a portion of a docking station, consistent with embodiments of the present disclosure.

FIG. 4 shows a cutaway view of a portion of an example of the docking station 100, consistent with embodiments of the present disclosure. In the example of FIG. 4, an air path 410, which may be the air path 150 from FIG. 1, shows more detail for the path that air and debris follows during an auto-evacuation operation. The example of FIG. 4 shows one embodiment that uses a cyclonic separator to urge the debris to enter trash bag 114, while clean air exits the docking station 100. In other embodiments, as discussed above, the cyclonic separator is not used in lid 110, but the docking station 100 relies on gravity to separate the debris from the air.

In the embodiment of FIG. 4, the dock dirty air inlet 108 is shown on the back of docking station 100, but in other embodiments dock dirty air inlet 108 may be on any other side of docking station 100. Air and debris from the robot cleaner 101 are drawn into an air path 150 through dock dirty air inlet 108 by suction created by the dock suction motor 106 (shown in hidden lines), and through the dock inlet duct 402 to the lid 110. The lid inlet duct 416 is fluidly coupled with the dock inlet duct 402, and the suction created by the dock suction motor 106 urges the air and debris into the lid 110 through lid inlet duct 416. The air and debris enter a separation chamber defined by baffles 408, which may urge the air and debris to rotate, as shown by cyclonic air path 414. The rotation of the air and debris may result in the formation of a "cyclone," which urges the debris to separate from the air and drop into the trash bag 114 through debris opening 412. The air is then drawn into lid outlet duct 418 by the suction from the dock suction motor 106. The lid outlet duct 418 is fluidly coupled with the dock outlet duct 404, and the air is drawn into the dock outlet duct 404 by the suction created by dock suction motor 106 and is urged to exit the docking station 100 through the dock clean air outlet 134. To reduce and/or prevent any residual debris in the air from exiting the docking station 100, the air passes through dock outlet filter 132 (see FIG. 1) before exiting the docking station through the dock clean air outlet 134.

Figure 5:
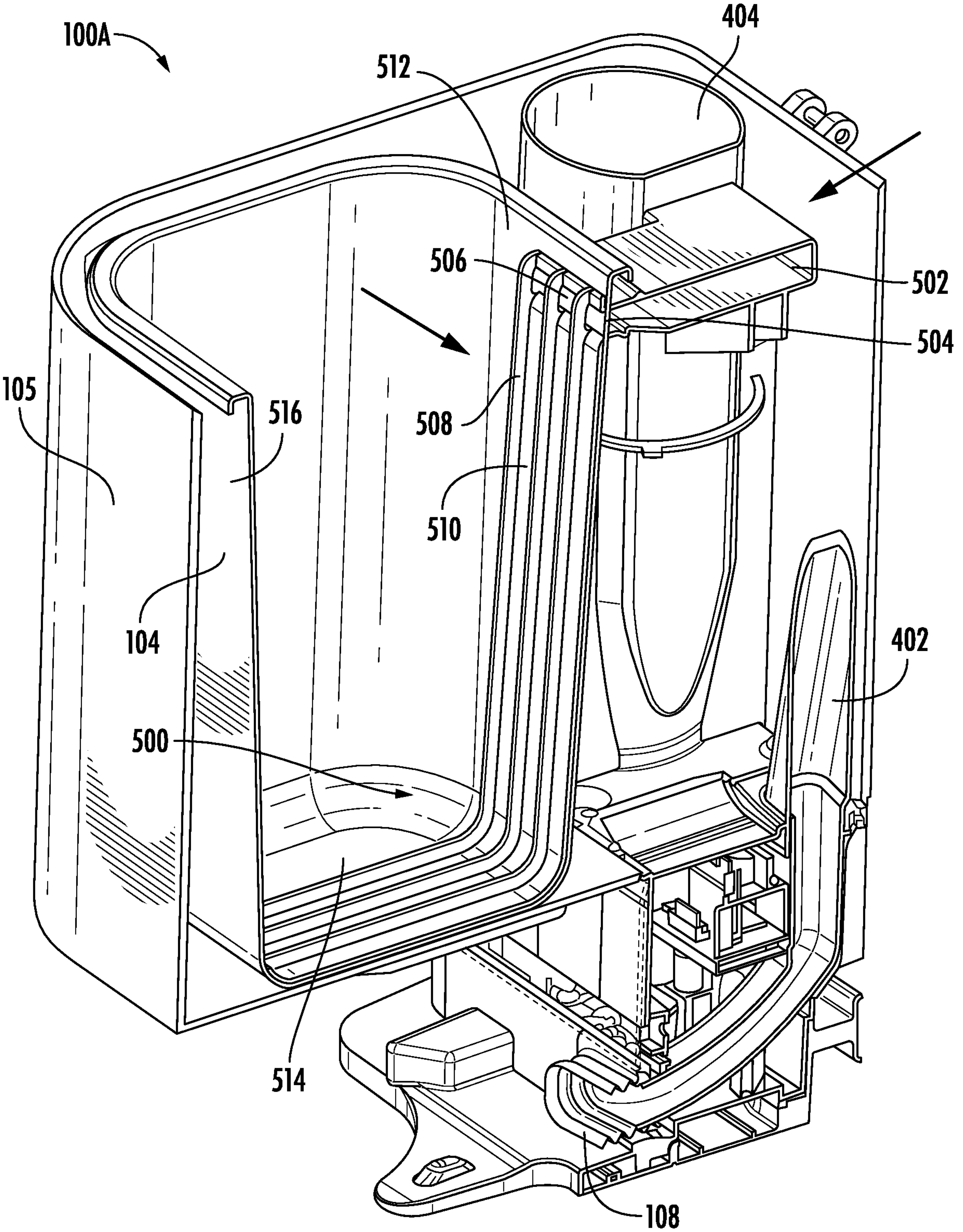
FIG. 5 shows a cross-sectional view of a docking station taken along the line A-A of FIG. 2B, consistent with embodiments of the present disclosure.

FIG. 5 shows a cross-sectional view of an example docking station taken along the line A-A of FIG. 2B, consistent with embodiments of the present disclosure. The example of FIG. 5 shows a bag holding system 500 to prevent trash bag 114 from collapsing within the trash bin 105 due to the suction from dock suction motor 106 during an auto-evacuation operation. It should be noted that the docking station 100A in the example of FIG. 5 is an example of the docking station 100A from FIG. 1A, which includes the debris receptacle 104 disposed within the trash bin 105. For the embodiment of the docking station 100 from FIG. 1, the bag holding system 500 is comparable to the bag holding system 500 for docking station 100A, except that the bag holding system 500 would be disposed within the trash bin 105 instead of within the debris receptacle 104.

In the example of FIG. 5, a bag suction inlet 502 is fluidly coupled with the dock outlet duct 404, whereby the suction created by the dock suction motor 106 in the dock outlet duct 404 creates a suction force in bag suction inlet 502. The bag suction inlet 502 is fluidly coupled through debris receptacle suction outlet 504 with one or more bag suction channels 506, which are disposed in the debris receptacle 104. Each bag suction channel 506 is formed by two suction channel walls 508, a first suction channel wall 508 disposed on a first side of each bag suction channel 506, and a second suction channel wall 508 disposed on a second side of each bag suction channel 506, the first suction channel wall 508 and the second suction channel 508 wall extend substantially perpendicular from a bag suction channel base 510. The one or more bag suction channels 506 are disposed from the debris receptacle suction outlet 504, down a first wall 512 of the debris receptacle 104, across a bottom surface 514 of the debris receptacle 104 and extending in an upward direction on a second wall 516 of the debris receptacle 104, substantially opposite the first wall 512. In other embodiments, the one or more bag suction channels may be disposed on any or all walls of the debris receptacle 104.

The suction generated by the dock suction motor 106 creates a suction force in the one or more bag suction channels 506, which draws the trash bag 114 against the suction channel walls 508 during an auto-evacuation operation, thereby preventing the trash bag 114 from collapsing under the suction force created in the lid 110 by dock suction motor 106.

Figure 6A:
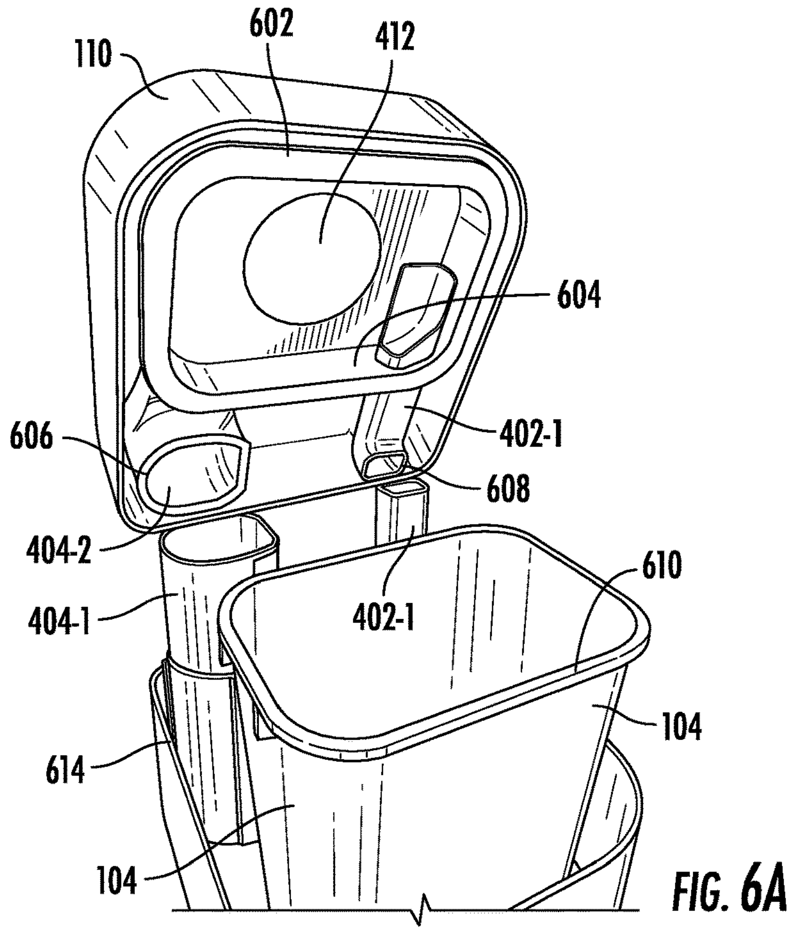
FIG. 6A shows a cutaway perspective view of a docking station with the lid open, consistent with embodiments of the present disclosure.
Figure 6B:
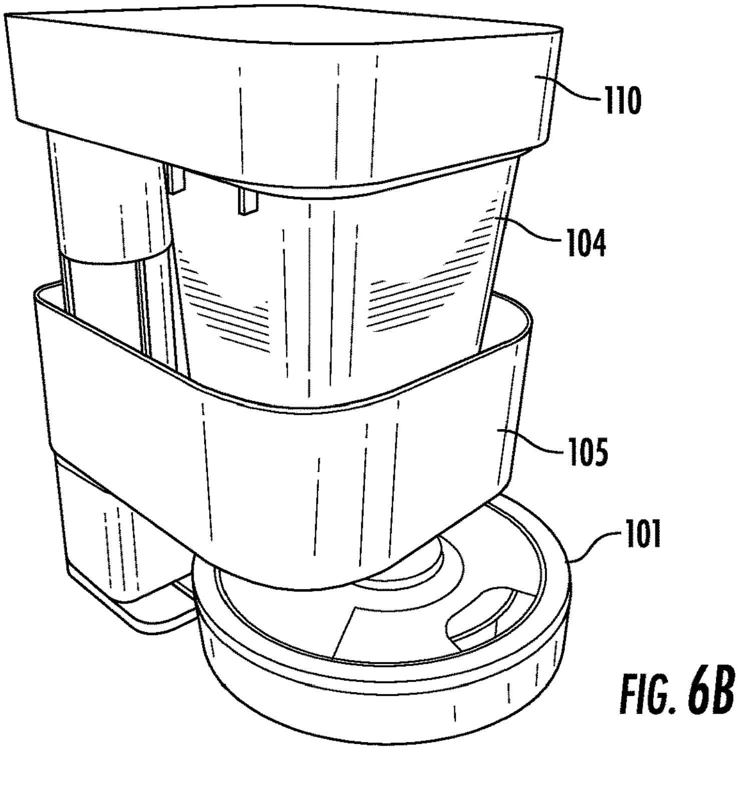
FIG. 6B shows a cutaway perspective view of the docking station of FIG. 6A with the lid closed, consistent with embodiments of the present disclosure.

FIG. 6A shows a cutaway perspective view of an example docking station 100 with the lid 110 open, and FIG. 6B shows a cutaway perspective view of the docking station 100 of FIG. 6A with the lid 110 closed, consistent with embodiments of the present disclosure. In the example of FIG. 6A, lid 110 is rotated about the hinge 128 into the open configuration. In this embodiment, the docking station 100 further includes the debris receptacle 104. To create a suction chamber between the lid 110 and the debris receptacle 104, the lid 110 includes a perimeter wall 604, which is disposed within the lid 110 and is configured to mate with a top surface 610 of the debris receptacle 104. To encourage formation of a seal (e.g., a substantially air-tight seal) between the perimeter wall 604 and the top surface 610, the perimeter wall 604 includes lid air seal 602.

In the embodiment shown in FIG. 6A, the dock inlet duct 402 and the dock outlet duct 404 from FIG. 4 are each composed of two sections, dock inlet ducts 402-1 and 402-2, and dock outlet ducts 404-1 and 404-2. Dock inlet duct 402-1 and dock outlet duct 404-1 are disposed within the body of the trash bin 105, in a cavity formed between an inner wall 614 of trash bin 105 and an outer wall 612 of debris receptacle 104. The lid inlet duct 402-2 and lid outlet duct 404-2 are disposed within the lid 110, in a cavity formed between a lid inner wall 616 of lid 110 and the perimeter wall 604 of lid 110.

To encourage formation of a seal between dock inlet duct 402-1 and lid inlet duct 402-2, the lid inlet duct 402-2 includes a lid inlet air seal 608. To encourage formation of seal between the dock outlet duct 404-1 and the lid outlet duct 404-2, the lid outlet duct 404-2 includes lid outlet air seal 606. In other embodiments, the lid inlet air seal 608 may be disposed on either dock inlet duct 402-1 or lid inlet duct 402-2, or both, and lid outlet air seal 606 may be disposed on either dock outlet duct 404-1 or lid outlet duct 404-2, or both.

In an embodiment, the lid air seal 602, lid inlet air seal 608, and lid outlet air seal 606 may be manufactured of Ethylene Propylene Diene Monomer (EPDM) foam. In other embodiments, the lid air seal 602, lid inlet air seal 608, and lid outlet air seal 606 may be manufactured of any other compliant material suitable for creating an effective air seal.

Figure 7B:
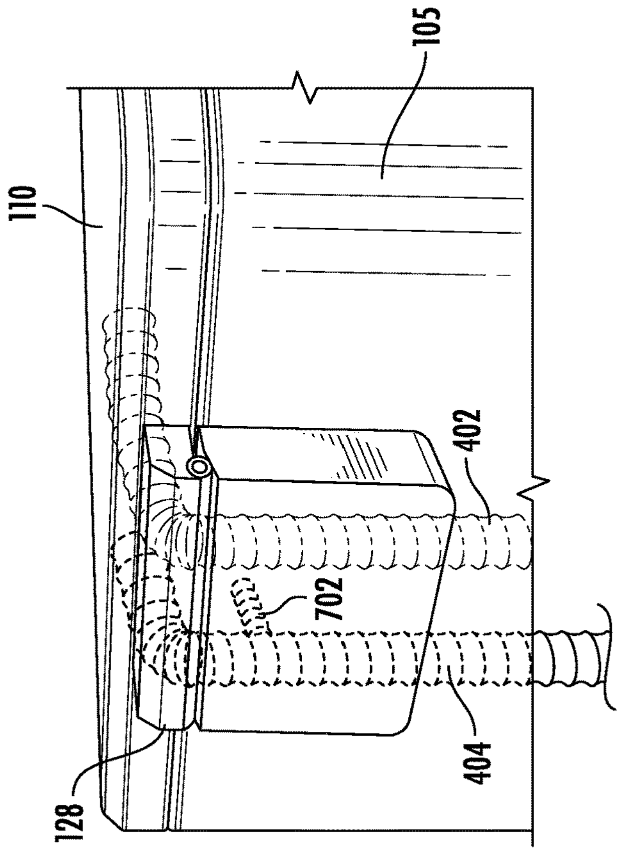
FIG. 7B shows a detail view of the docking station of FIG. 7A, consistent with embodiments of the present disclosure.
Figure 7A:
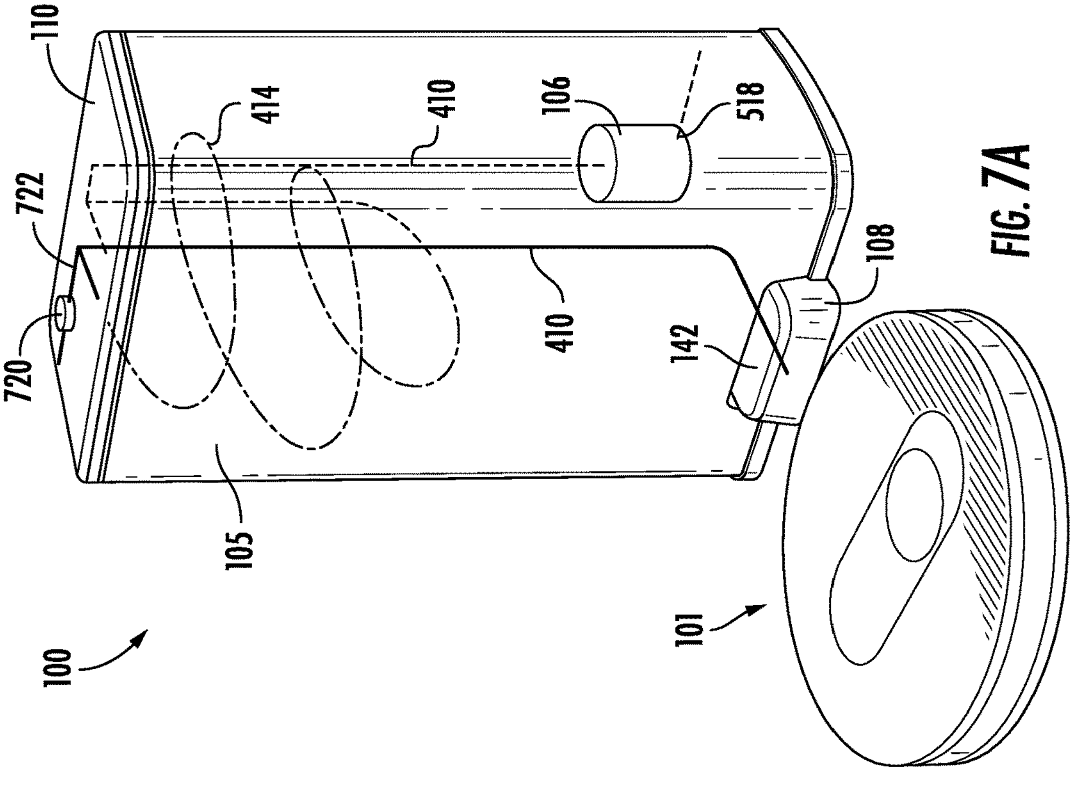
FIG. 7A shows another perspective view of a docking station, consistent with embodiments of the present disclosure.

FIG. 7A shows perspective view of another example of the docking station 100, consistent with embodiments of the present disclosure. In the example docking station 100 of FIG. 7A, the dock dirty air inlet 108 may be disposed directly below pedal 142, such that when the robotic cleaner 101 is docked with the docking station 100, for example, to perform an auto-evacuation operation, robotic cleaner 101 physically blocks the pedal 142 from being engaged to open the lid 110, thereby preventing the user from opening the lid 110 on trash bin 105 and interfering with the auto-evacuation operation.

In the example of FIG. 7A, the docking station 100 may also include a backflow preventor 518, which may include one or more one-way valves or doors, which may be further configured to return to a seated/sealed position when the flow rate and/or pressure of the air through the air path 410 falls below a threshold (e.g., the dock suction motor 106 is turned off) to reduce and/or otherwise prevent air from escaping from the dock clean air outlet 134. In some instances, the backflow preventor 518 may be configured to open with air flow only when the suction motor 106 is exhausting air from the docking station 100.

In some instances, the docking station 100 may include one or more odor control assemblies 720 to control the odor in the trash bag 114 of docking station 100. The odor control assembly 720 may include a fragrance member fluidly coupled with odor control air path 722, which is configured to release fragrance particles output by the odor control assembly 720 during use, e.g., during evacuation of the robot dust cup 140 in the robotic cleaner 101 into the trash bag 114 in the docking station 100. Suction created by dock suction motor 106 causes a suction force in the odor control air path 722, which may urge fragrance particles from the fragrance member in odor control assembly 720 to enter the trash bag 114, thereby reducing or eliminating odors in the trash bag 114. In some instances, the odor control assembly 720 may be removably coupled to the lid 110. In some other instances, the odor control assembly 720 may be removably coupled to the trash bin 105. In still other instances, the odor control assembly 720 may be disposed anywhere on the docking station 100 that allows the odor control assembly 720 to be fluidly coupled with the air path 410 via odor control air path 722.

FIG. 7B shows a detail view of another example of the docking station 100, consistent with embodiments of the present disclosure. In the example docking station 100 of FIG. 7B, dock inlet duct 402 and dock outlet duct 404 consist of tubes or hoses configured to bend into the lid 110. The use of flexible tubes or hoses may reduce a number of joints (e.g., the joints where the dock inlet duct 402-1 and lid inlet duct 402-2 meet and where the dock outlet duct 404-1 and lid outlet duct 404-2 meet) which may reduce a number of sealing locations (e.g., the lid inlet air seal 608 and lid outlet air seal 606 may be omitted). Also shown in FIG. 7B a bag suction hose 702, may fluidly couple with, for example, bag suction inlet 502.

Figure 8:
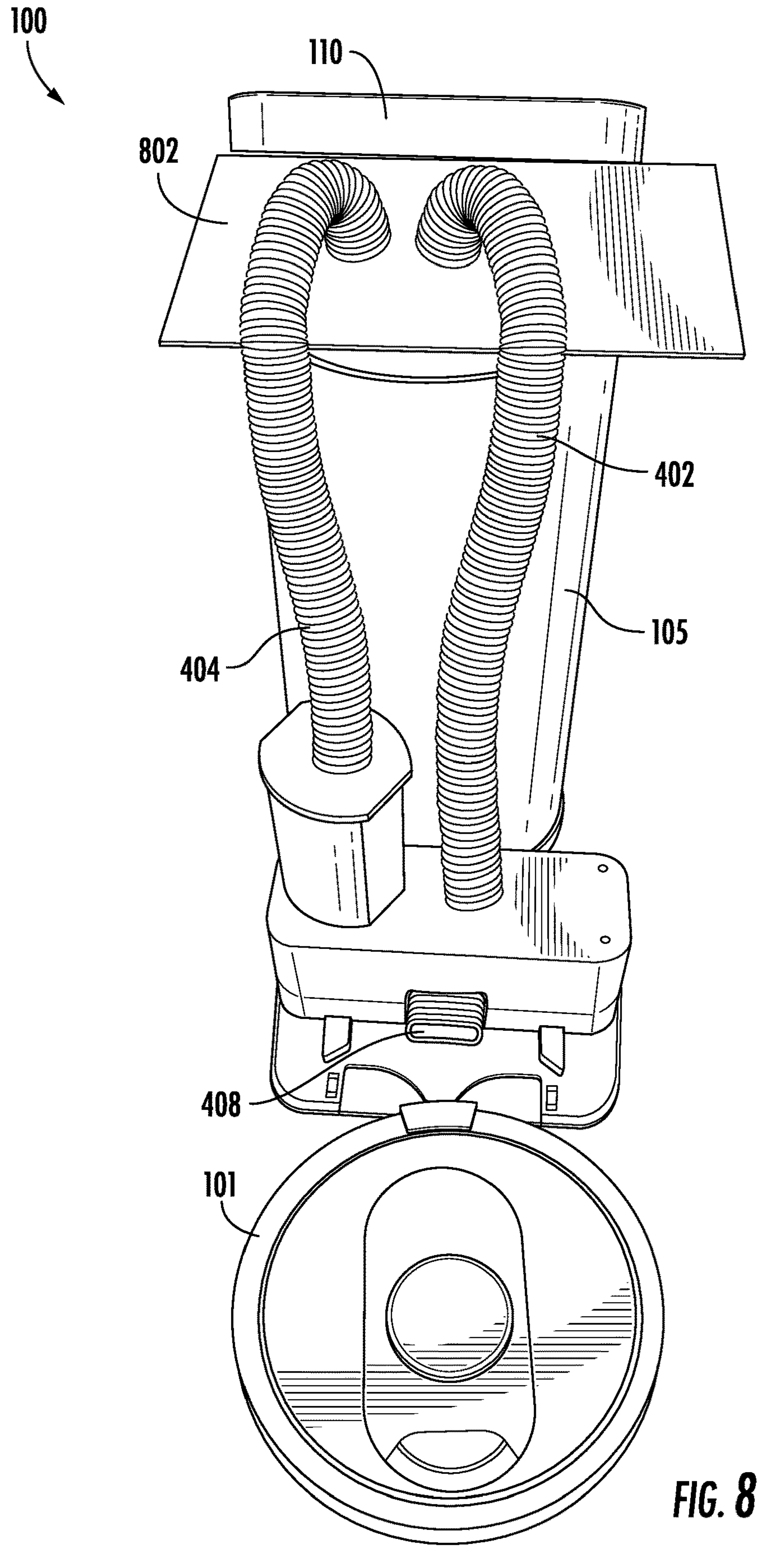
FIG. 8 shows a front perspective view of the docking station of FIG. 2A, consistent with embodiments of the present disclosure.

FIG. 8 shows a front perspective view of the docking station of FIG. 7B, consistent with embodiments of the present disclosure. FIG. 8 shows the lid 110 disassembled to expose the tubes or hoses of the dock inlet duct 402 and dock outlet duct 404 fluidly coupled to a lid inner surface 802.

Figure 9:
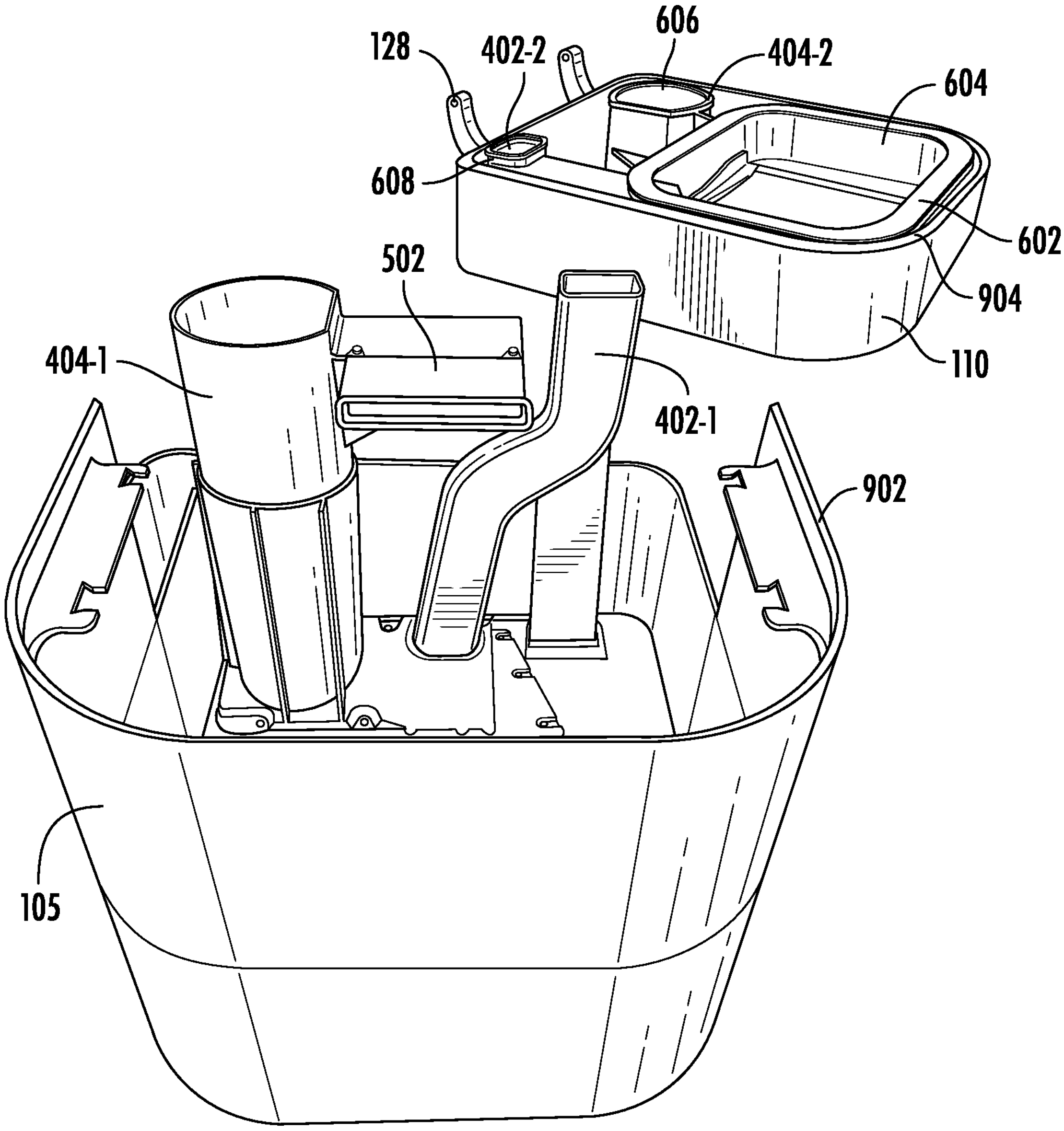
FIG. 9 shows a cutaway view of a portion of an example of a docking station, consistent with embodiments of the present disclosure.

FIG. 9 shows a perspective front view of a portion of an example of the docking station 100, with the lid 110 removed and the trash bin 105 cut away to reveal the bag suction inlet 502. In the example docking station 100 of FIG. 9, the bag suction inlet 502 connects to the trash bin 105 and the bag holding system 500 and is configured to prevent the trash bag 114 from collapsing within the trash bin 105 due to the suction from dock suction motor 106 during an auto-evacuation operation.

In some embodiments, the docking station 100 may use a 2-step evacuation operation. This 2-step operation may be used, for example, to allow for auto-evacuation when the trash bag 114 is full. Without the 2-step evacuation, attempting an auto-evacuation operation when the trash bag 114 is full may cause the auto-evacuation operation to fail.

Figure 10A:
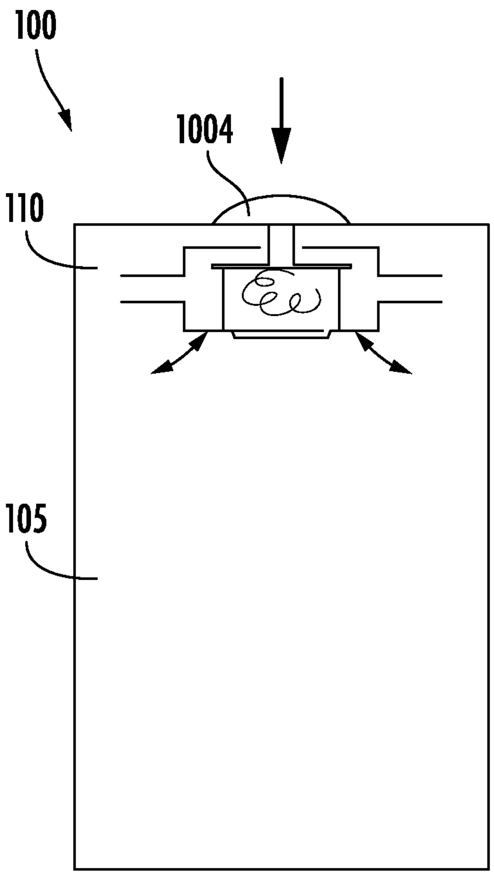
FIG. 10A shows a cross-sectional view of an example docking station configured for 2-step evacuation in the fill position, consistent with embodiments of the present disclosure.
Figure 10B:
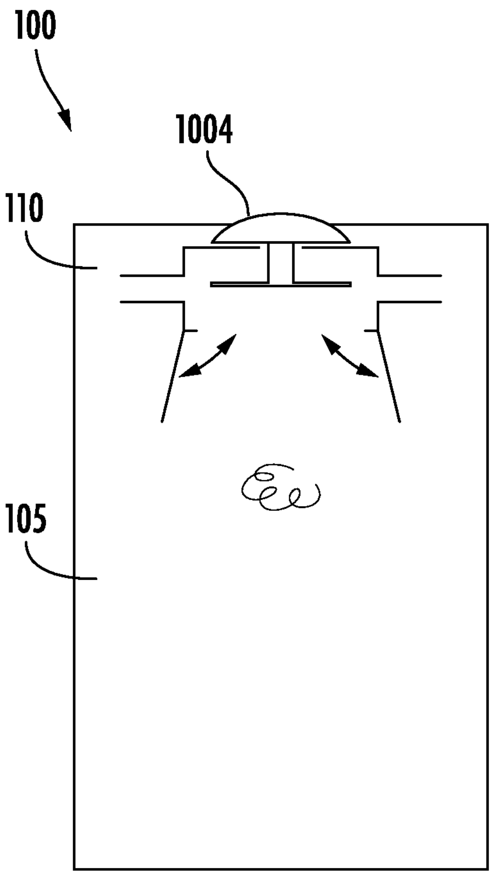
FIG. 10B shows a cross-sectional view of the example debris bin of FIG. 10A in the empty position, consistent with embodiments of the present disclosure.

FIG. 10A shows a cross-sectional view of an example docking station 100 configured for 2-step evacuation in a fill position, and FIG. 10B shows a cross-sectional view of the example debris bin 1000 of FIG. 10A in an empty position, consistent with embodiments of the present disclosure. In the examples of FIGS. 10A and 10B, docking station 100 includes debris bin 1000 disposed within the lid 110 of docking station 100 and configured to receive debris from the robot dust cup 140 during an auto-evacuation operation.

In an embodiment, a plunger 1004 is disposed on the exterior of lid 110 to allow a user to depress the plunger 1004 to manually open the debris bin 1000 to urge the debris to drop from the debris bin 1000 into the trash bag 114. When the docking station 100 performs an auto-evacuation operation, the debris bin 1000 is in the fill position (FIG. 10A), to allow debris from the robotic cleaner 101 to be deposited into the debris bin 1000 by the suction created by dock suction motor 106. When the auto-evacuation operation is complete, or when the user otherwise desires to empty the contents of the debris bin 1000 into trash bag 114, the user may apply a downward force to plunger 1004, which causes the debris bin 1000 to transition to the empty position (FIG. 10B), whereby gravity urges the debris to drop into trash bag 114. In an embodiment, the debris bin 1000 may be configured to transition to the empty position automatically after the completion of the auto-evacuation operation to avoid the user from having to manually empty the debris bin 1000. In another embodiment, the debris bin 1000 may be configured to transition to the empty position to empty the debris when the lid 110 is manually opened by the user.

Figure 10C:
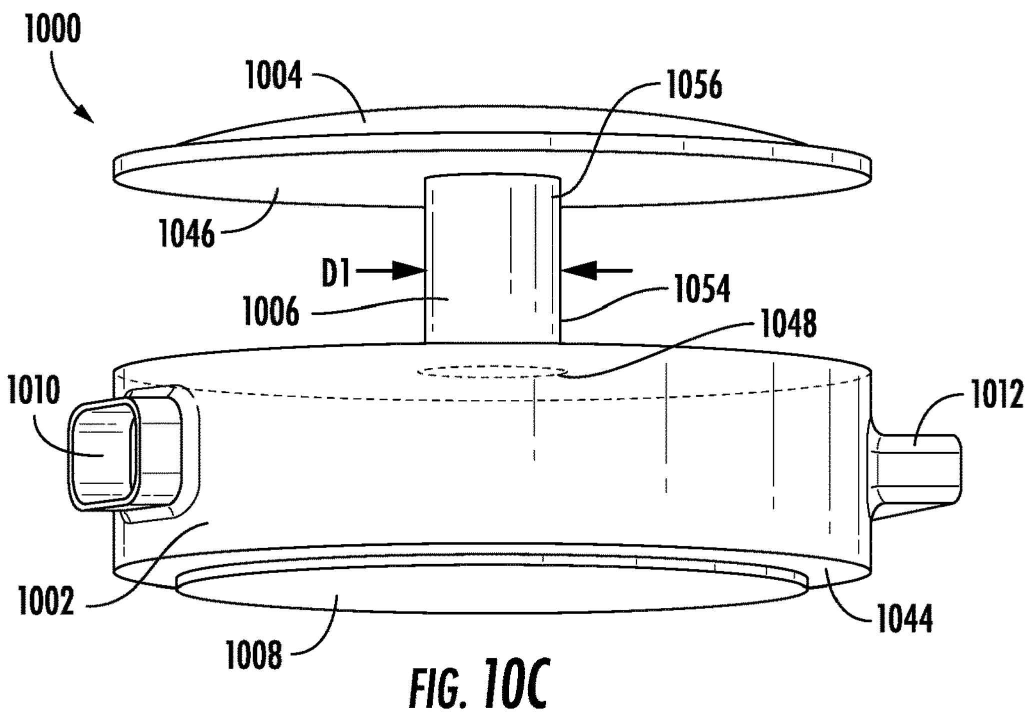
FIG. 10C shows a perspective view of an example debris bin for 2-step evacuation in the fill position, consistent with embodiments of the present disclosure.
Figure 10D:
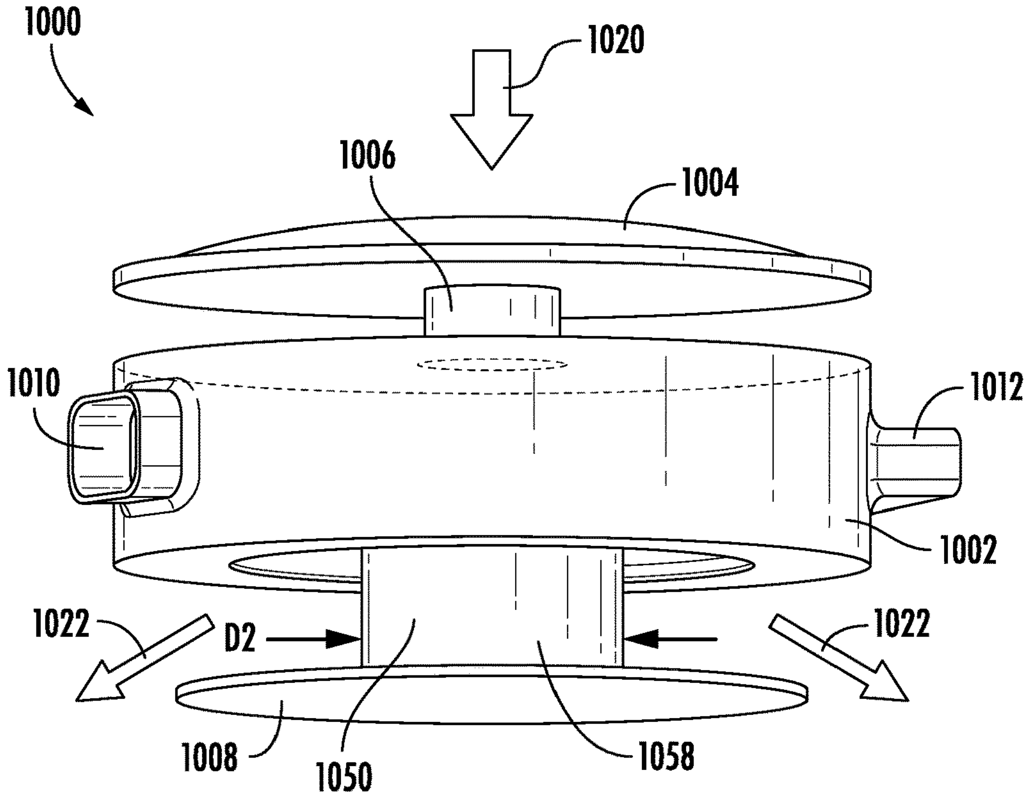
FIG. 10D shows a perspective view of the example debris bin of FIG. 10A in the empty position, consistent with embodiments of the present disclosure.

FIG. 10C shows a perspective view of an example debris bin 1000 for 2-step evacuation in the fill position, and FIG. 10D shows a perspective view of the example debris bin 1000 of FIG. 10A in the empty position, consistent with embodiments of the present disclosure. Debris bin 1000 includes the plunger 1004 and the shaft 1006, which includes upper shaft 1054 and lower shaft 1050. The shaft 1006 has a first end 1056 coupled to a bottom surface of plunger 1004 and a second end 1058 which is coupled to a debris bin lid 1008. Upper shaft 1054 has a diameter of D1 and is disposed to enter debris bin body 1002 through hole 1048 (shown in hidden lines) and couple to lower shaft 1050. Lower shaft 1050 may have a diameter of D2, where D2 is greater than D1, creating shoulder 1052 (see FIG. 10E) to create a mating surface between lower shaft 1050 and the top surface 1046 of plunger 1004. Debris bin lid 1008 is disposed on a bottom surface 1044 of the debris bin body 1002 and configured to engage with, and to provide a seal against, the bottom surface 1044 to contain debris in debris bin 1000 during an auto-evacuation operation. Debris bin 1000 also includes the debris bin air inlet 1010 and debris bin air outlet 1012, which are fluidly coupled to air path 410 (see, for example, FIG. 4).

FIG. 10D shows the debris bin 1000 in the empty position, where the user has applied a downward force 1020 to the top surface 1046 of plunger 1004. The downward force 1020 applied to the top surface 1046 of plunger 1004 causes the upper shaft 1054 and lower shaft 1050 to be forced down, which in turn forces debris bin lid 1008 to be disengaged from the bottom surface 1044 of debris bin body 1002, resulting in an opening to allow the debris to drop out of the debris bin 1000 into the trash bag 114.

Figure 10E:
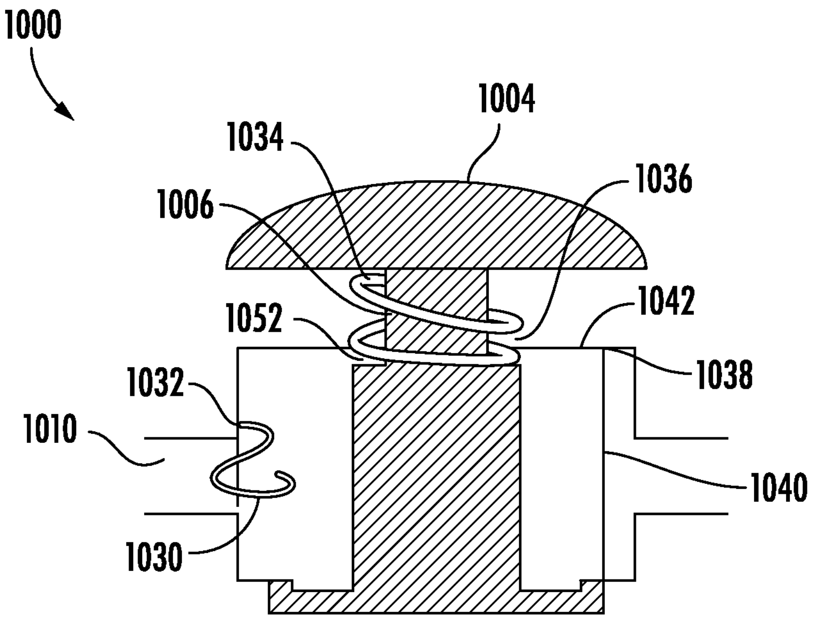
FIG. 10E is a cross-sectional view of an example debris bin, consistent with embodiments of the present disclosure.

FIG. 10E is a cross-sectional view of an example debris bin 1000, consistent with embodiments of the present disclosure. FIG. 10E shows details of one possible example embodiment of the debris bin 1000. In FIG. 10E, the debris bin 1000 includes the plunger 1004 coupled to the shaft 1006. As stated previously, when a user applies a downward force on the top surface of the plunger 1004, the lower shaft 1050 is forced against the debris lid 1008, causing the debris lid 1008 to move downward and creating an opening between the debris lid 1008 and the debris bin bottom surface 1044 to allow the debris exit the debris bin 1000 and be collected within the trash bag 114. When the force is released from the plunger 1004, a plunger spring 1034 may provide an upward force on the plunger 1004 to cause the plunger 1004 to return to the fill position and force the debris lid 1008 to provide a seal against the debris bin bottom surface 1044. In order to reduce and/or prevent debris from exiting the debris bin 1000 through hole 1048 (FIG. 10C) in debris bin body 1002, the debris bin 1000 may include O-ring 1036 disposed around a circumference of the upper shaft 1054 and configured to provide a seal between the bottom surface 1046 of the plunger 1004 and the debris bin top 1042 of the debris bin body 1002. In an embodiment, the lower shaft 1050 is configured to have a larger diameter than the hole 1048 in order to seal the hole 1048 during an auto-evacuation operation. To further provide a seal, the debris bin 1000 may include a the plunger seal 1038, disposed around the circumference of the hole 1048 and configured to provide a seal between the top surface 1056 of the lower shaft 1050 and the bottom surface 1046 of the debris bin top 1042. In an embodiment, the plunger seal 1038 may be composed of sealing foam. In other embodiments, the plunger seal 1038 may be composed of any other suitable sealing material as would be known to a person of skill in the art.

The example of FIG. 10E includes the debris bin air inlet 1010 and the debris bin air outlet 1012, which create an air path to urge the debris from the robot dust cup 140 in robotic cleaner 101 into the debris bin 1000 during an auto-evacuation operation. In order to reduce and/or prevent debris from exiting the debris bin 1000 and back into the debris bin air inlet 1010, there may be a debris bin backflow preventer 1030 which may include one or more one-way valves or doors, which may be further configured to return to a seated/scaled position when the flow rate and/or pressure of the air through the air path 410 falls below a threshold (e.g., the dock suction motor 106 is turned off) to reduce and/or prevent air from escaping from the debris bin air inlet 1010. In the example of FIG. 10E, the debris bin backflow preventer 1030 may be held in a closed position by backflow preventer spring 1032.

In order to reduce and/or prevent debris from exiting the debris bin 1000 through debris bin air outlet 1012, a filter 1040 is disposed within the debris bin 1000 and is fluidly coupled to debris bin air outlet 1012, thereby reducing and/or preventing debris from exiting the debris bin 1000 through debris bin air outlet 1012.

Figure 11A:
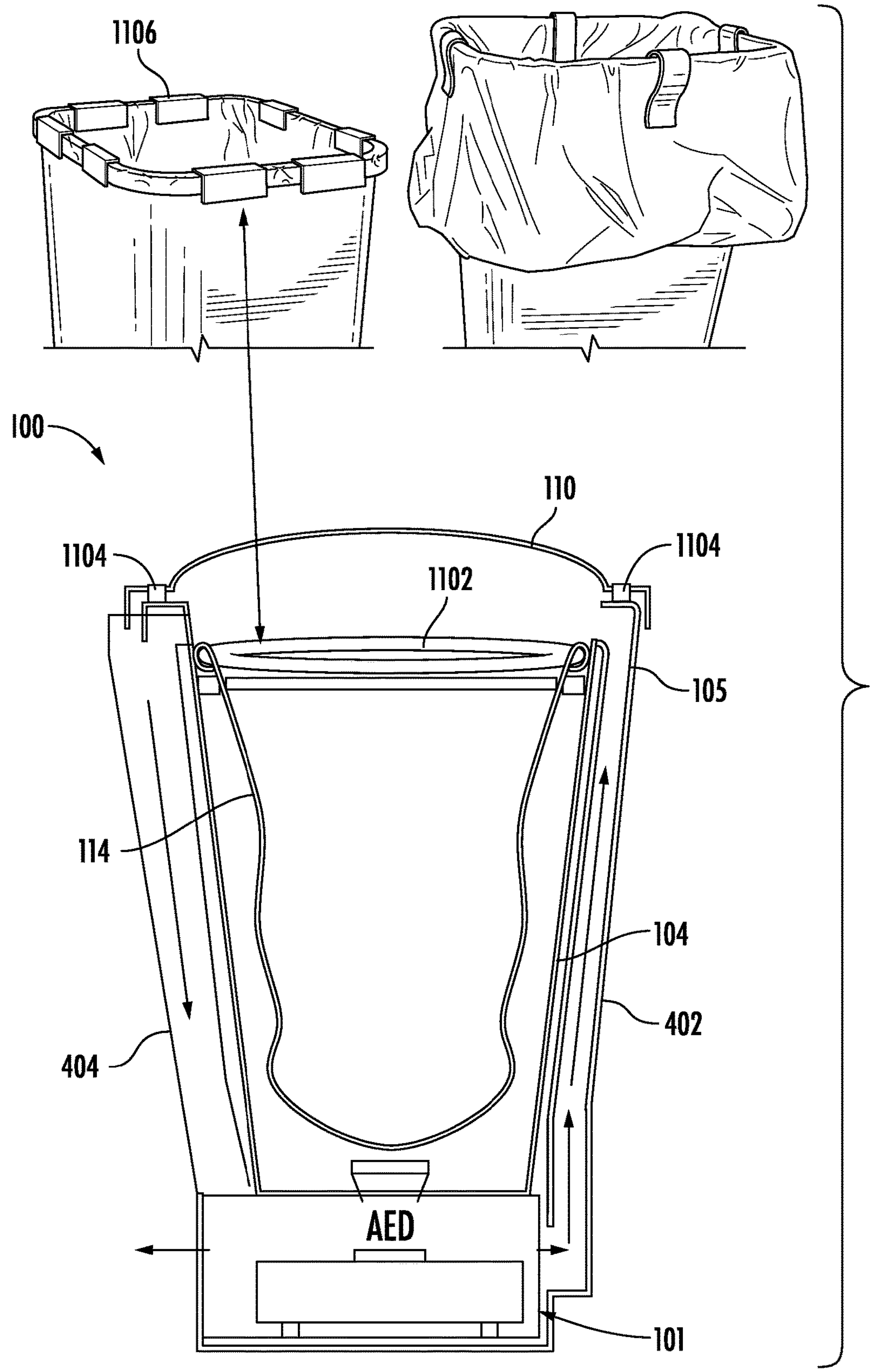
FIG. 11A shows a cross-sectional view of an example of the docking station of FIG. 3 for 1-step evacuation taken along the line B-B of FIG. 3, consistent with embodiments of the present disclosure.

FIG. 11A shows a cross-sectional view of an example of the docking station 100 of FIG. 3, configured for 1-step evacuation, taken along the line B-B of FIG. 3, consistent with embodiments of the present disclosure. FIG. 11A shows an example of the docking station 100 configured for 1-step evacuation, and the docking station 100 in this example also includes the debris receptacle 104. The example of FIG. 11A also shows the robotic cleaner 101 disposed substantially completely underneath the trash bin 105 during docking and auto-evacuation. FIG. 11A shows various example mechanisms to hold the trash bag 114 in the debris receptacle 104, which may include a circular tube or pipe 1102 disposed within the trash bag 114 and configured to exert an outward force against an interior surface of the debris receptacle 104, thereby preventing the trash bag 114 from collapsing into the debris receptacle 104. In some instances, plastic clips or elastic 1106 may be used to hold the top edge of trash bag 114 to the top edge of debris receptacle 104. In order to encourage the formation of a seal between the lid 110 and the trash bin 105, EPDM edge foam 1104 may be disposed on the top surface 902 of trash bin 105 and/or a bottom surface 904 of the lid 110.

Figure 11B:
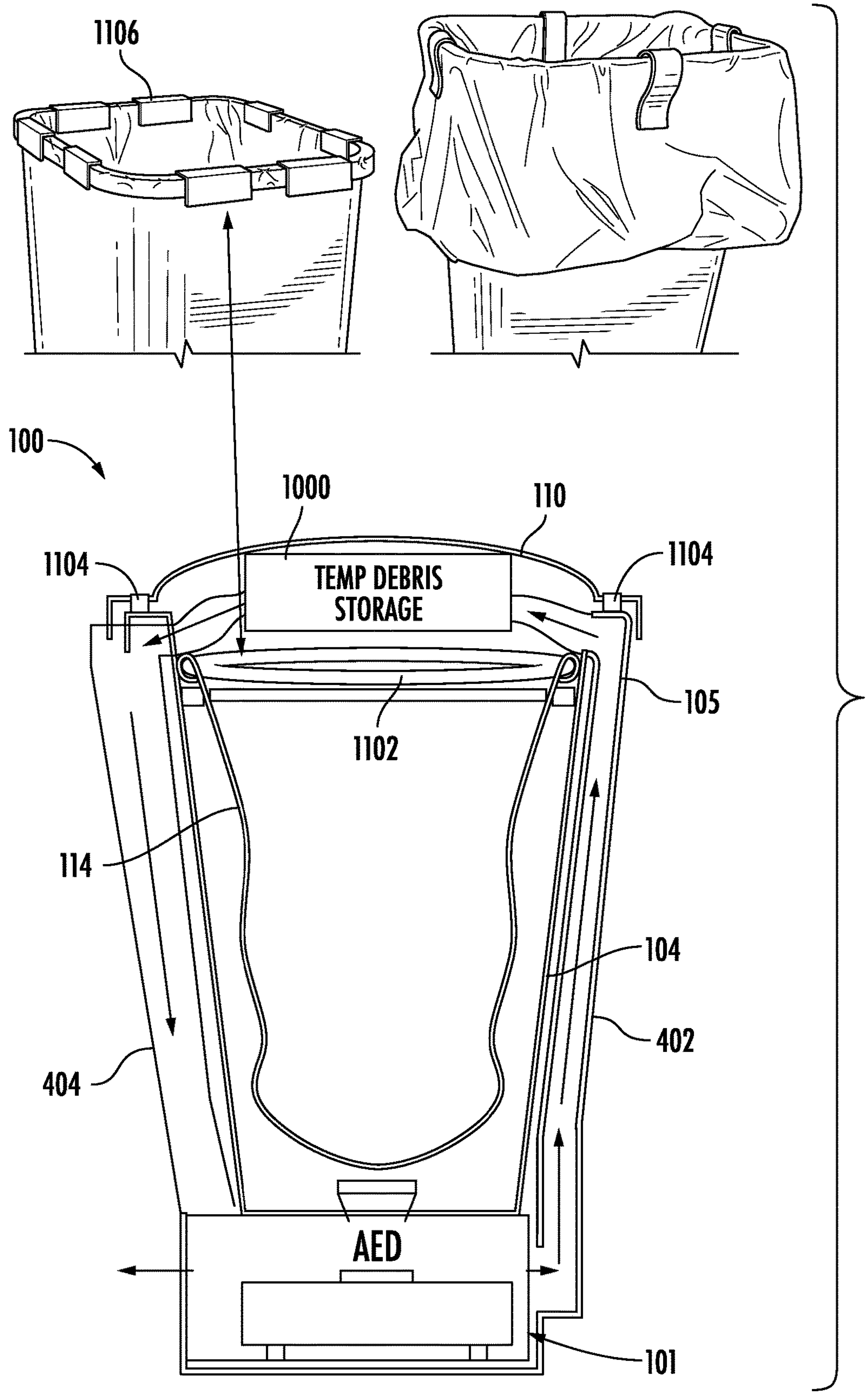
FIG. 11B shows a cross-sectional view of an example of a docking station for 2-step evacuation taken along the line B-B of FIG. 3, consistent with embodiments of the present disclosure.

FIG. 11B shows a cross-sectional view of an example of the docking station of FIG. 11A, but configured for 2-step evacuation, taken along the line B-B of FIG. 3, consistent with embodiments of the present disclosure. The example of FIG. 11B shows all the components described above for FIG. 11A, but the lid 110 of docking station 100 includes the debris bin 1000 as described above in FIGS. 10A-10E.

According to one aspect of the disclosure there is thus provided a docking station for a robotic cleaner including: a base; a trash bin having a substantially air-impermeable trash bag removably disposed thereon; a dock dirty air inlet defined in the base, the dock dirty air inlet being configured to fluidly couple to the robotic cleaner; and a dock suction motor, wherein the dock suction motor is activated after the robotic cleaner is determined to be docked with the docking station and configured to urge debris from the robotic cleaner into the trash bin.

According to another aspect of the disclosure, there is thus provided a system for robotic cleaning including: a base; a trash bin; a trash bag disposed within the trash bin; a lid rotatably coupled with the trash bin; a pedal operatively coupled with the lid and configured to urge the lid into an open position upon application of a force to a top surface of the pedal; a dock dirty air inlet defined in the base; a dock suction motor; and a robotic cleaner, wherein the dock suction motor is activated after the robotic cleaner is determined to be docked with the docking station. The robotic cleaner including: a robot dust cup configured to receive debris, the robot dust cup including a robot inlet and a robot outlet port, the robot outlet port configured to fluidly couple to the docking station; a robot suction motor; and an agitator.

According to yet another aspect of the disclosure, there is thus provided a docking station for a robotic cleaner including: a base; a trash bin; a trash bag disposed within the trash bin; a lid rotatably coupled with the trash bin; a pedal operatively coupled with the lid and configured to urge the lid into an open position upon application of a force to a top surface of the pedal; a debris bin disposed within the lid and configured to receive debris from the robotic cleaner; a dock suction motor, wherein the dock suction motor is activated after the robotic cleaner is determined to be docked with the docking station and configured to urge debris from the robotic cleaner into the trash bin; a bag holding system fluidly coupled to the dock suction motor and configured to prevent the trash bag from collapsing when the dock suction motor is active; and a dock dirty air inlet defined in the base, the dock dirty air inlet being configured to fluidly couple to the robotic cleaner.

As used in this application and in the claims, a list of items joined by the term "and/or" can mean any combination of the listed items. For example, the phrase "A, B and/or C" can mean A; B; C; A and B; A and C; B and C; or A, B and C. As used in this application and in the claims, a list of items joined by the term "at least one of" can mean any combination of the listed terms. For example, the phrases "at least one of A, B or C" can mean A; B; C; A and B; A and C; B and C; or A, B and C.

Unless otherwise stated, use of the word "substantially" may be construed to include a precise relationship, condition, arrangement, orientation, and/or other characteristic, and deviations thereof as understood by one of ordinary skill in the art, to the extent that such deviations do not materially affect the disclosed methods and systems. Throughout the entirety of the present disclosure, use of the articles "a" and/or "an" and/or "the" to modify a noun may be understood to be used for convenience and to include one, or more than one, of the modified noun, unless otherwise specifically stated. The terms "comprising", "including" and "having"

are intended to be inclusive and mean that there may be additional elements other than the listed elements.

Although the methods and systems have been described relative to a specific embodiment thereof, they are not so limited. Obviously, many modifications and variations may become apparent in light of the above teachings. Many additional changes in the details, materials, and arrangement of parts, herein described and illustrated, may be made by those skilled in the art.

What is claimed is:

1. A docking station for a robotic cleaner comprising:

a base;

a trash bin having a substantially air-impermeable trash bag removably disposed therein;

a dock dirty air inlet defined in the base, the dock dirty air inlet being configured to fluidly couple to the robotic cleaner;

a dock suction motor, wherein the dock suction motor is activated after the robotic cleaner is determined to be docked with the docking station and configured to urge debris from the robotic cleaner into the trash bin;

a bag holding system fluidly coupled to the dock suction motor and configured to prevent the trash bag from collapsing when the dock suction motor is activated, the bag holding system including one or more bag suction channels disposed within the trash bin, wherein:

each of the one or more bag suction channels is formed by:

a first suction channel wall disposed on a first side of each bag suction channel, and a second suction channel wall disposed on a second side of each bag suction channel, the first suction channel wall and the second suction channel wall extending substantially perpendicular from a bag suction channel base; and the one or more bag suction channels extend from a debris receptacle suction outlet, down a first wall of the trash bin, across a bottom surface of the trash bin and extend in an upward direction on a second wall of the trash bin, the second wall substantially opposite the first wall.

2. The docking station for the robotic cleaner of claim 1, further comprising a removable debris receptacle disposed within the trash bin and wherein the trash bag is disposed within the debris receptacle.

3. The docking station for the robotic cleaner of claim 1, further comprising:

a dock inlet duct fluidly coupled with the dock dirty air inlet and the dock suction motor;

a dock lid rotatably coupled with the trash bin, the dock lid fluidly coupled with the dock suction motor via the dock inlet duct;

a dock outlet duct fluidly coupled with the dock suction motor; and a dock clean air outlet fluidly coupled with the dock suction motor and configured to allow clean air to exit the docking station.

4. The docking station for the robotic cleaner of claim 3, further comprising a pedal operatively coupled with the dock lid and configured to urge the dock lid into an open position upon application of a force to a top surface of the pedal.

5. The docking station for the robotic cleaner of claim 3, further comprising a touch-free sensor, wherein the dock lid is urged into an open position upon the touch-free sensor detecting a presence of a user.

6. The docking station for the robotic cleaner of claim 3, further comprising:

a debris bin disposed within the dock lid and configured to receive debris from the robotic cleaner during an auto-evacuation operation.

7. The docking station for the robotic cleaner of claim 6, wherein the debris bin further comprises:

a shaft including a first end and a second end;

a plunger coupled to the first end of the shaft;

a body configured to hold the debris from the robotic cleaner, the body having an opening on a bottom surface to allow the debris to exit the debris bin;

a debris bin air inlet disposed on the body and fluidly coupled to the dock inlet duct and configured to allow air and the debris from the robotic cleaner to enter the body;

a debris bin outlet disposed on the body and fluidly coupled to the dock outlet duct and configured to allow the air to exit the body;

a debris bin lid coupled to the second end of the shaft and configured to engage with the bottom surface of the body and to open to allow the debris to exit the debris bin; and a spring disposed on the shaft and configured to provide an upward force on the plunger to cause the plunger to return to a fill position and urge the debris bin lid to engage with the bottom surface of the body, wherein a downward force applied on a top surface of the plunger causes the debris bin lid to open to allow the debris to exit the debris bin into the trash bin.

8. The docking station for the robotic cleaner of claim 3, wherein the dock lid includes a cyclonic separator to urge debris into the trash bin.

9. The docking station for the robotic cleaner of claim 1, further comprising:

one or more odor controllers that include a fragrance body that is configured to release fragrance in response to air flow through the one or more odor control controllers, the one or more odor controllers being fluidly coupled with the dock suction motor such that activation of the dock suction motor causes air to flow through the one or more odor controllers.

10. The docking station of claim 1 further comprising a lid and a lid sensor configured to detect whether the lid is open.

11. The docking station of claim 10, wherein activation of the dock suction motor is prevented when the lid sensor detects that the lid is open.

12. A robotic cleaning system comprising:

a docking station, the docking station including:

a base;

a trash bin;

a trash bag disposed within the trash bin;

a dock lid rotatably coupled with the trash bin;

a pedal operatively coupled with the dock lid and configured to urge the dock lid into an open position upon application of a force to a top surface of the pedal;

a dock dirty air inlet defined in the base;

a dock suction motor; and a debris bin disposed within the dock lid; and a robotic cleaner, wherein the dock suction motor is activated after the robotic cleaner is determined to be docked with the docking station, the robotic cleaner including:

a robot dust cup configured to receive debris, the robot dust cup including a robot inlet and a robot outlet port, the robot outlet port configured to fluidly couple to the docking station;

a robot suction motor; and an agitator, wherein:

the debris bin is configured to receive debris from the robotic cleaner during an auto-evacuation operation and the debris bin includes:

a shaft including a first end and a second end;

a plunger coupled to the first end of the shaft;

a body configured to hold the debris from the robotic cleaner, the body having an opening on a bottom surface to allow the debris to exit the debris bin;

a debris bin air inlet disposed on the body and fluidly coupled to a dock inlet duct and configured to allow air and the debris from the robotic cleaner to enter the body;

a debris bin outlet disposed on the body and fluidly coupled to a dock outlet duct and configured to allow the air to exit the body;

a debris bin lid coupled to the second end of the shaft and configured to engage with the bottom surface of the body and to open to allow the debris to exit the debris bin; and a spring disposed on the shaft and configured to provide an upward force on the plunger to cause the plunger to return to a fill position and urge the debris bin lid to engage with the bottom surface of the body, wherein a downward force applied on a top surface of the plunger causes the debris bin lid to open to allow the debris to exit the debris bin into the trash bin.

13. The robotic cleaning system of claim 12, wherein the docking station receives the robotic cleaner within a cavity when the robotic cleaner is engaged with the docking station.

14. The robotic cleaning system of claim 12, further comprising:

a bag holding system fluidly coupled to the dock suction motor and configured to prevent the trash bag from collapsing when the dock suction motor is active, the bag holding system including one or more bag suction channels disposed within the trash bin, wherein:

each of the one or more bag suction channels is formed by a first suction channel wall disposed on a first side of each bag suction channel, and a second suction channel wall disposed on a second side of each bag suction channel, the first suction channel wall and the second suction channel wall extending substantially perpendicular from a bag suction channel base.

15. The robotic cleaning system of claim 12, wherein the dock dirty air inlet is disposed directly below the pedal such that when the robotic cleaner is docked with the docking station to perform an auto-evacuation operation, the robotic cleaner physically blocks the pedal from being engaged, thereby preventing a user from opening the dock lid and interfering with the auto-evacuation operation.

16. The robotic cleaning system of claim 12, further comprising a debris receptacle disposed within the trash bin and configured to be removable by a user, wherein the trash bag is disposed within the debris receptacle.

17. The robotic cleaning system of claim 12, wherein the docking station further includes a lid sensor configured to detect whether the lid is open and activation of the dock suction motor is prevented when the lid sensor detects that the lid is open.

18. A docking station for a robotic cleaner comprising:

a base;

a trash bin having a substantially air-impermeable trash bag removably disposed therein;

a dock dirty air inlet defined in the base, the dock dirty air inlet being configured to fluidly couple to the robotic cleaner;

a dock suction motor, wherein the dock suction motor is activated after the robotic cleaner is determined to be docked with the docking station and configured to urge debris from the robotic cleaner into the trash bin;

a dock inlet duct fluidly coupled with the dock dirty air inlet and the dock suction motor;

a lid rotatably coupled with the trash bin, the lid fluidly coupled with the dock suction motor via the dock inlet duct;

a dock outlet duct fluidly coupled with the dock suction motor; and a dock clean air outlet fluidly coupled with the dock suction motor and configured to allow clean air to exit the docking station, wherein the lid includes a cyclonic separator to urge debris into the trash bin.

19. The docking station of claim 18 further comprising a lid sensor configured to detect whether the lid is open.

20. The docking station of claim 19, wherein activation of the dock suction motor is prevented when the lid sensor detects that the lid is open.

* * * * *